United States Patent
D'Angelo et al.

(10) Patent No.: US 7,925,880 B2
(45) Date of Patent: Apr. 12, 2011

(54) AUTHENTICATION AND AUTHORIZATION ARCHITECTURE FOR AN ACCESS GATEWAY

(75) Inventors: Giovanni D'Angelo, Rome (IT); Marco Donna, Chivasso (IT); Nicola Ionfrida, Milan (IT)

(73) Assignee: Accenture Global Services Limited, Dublin (IE)

( * ) Notice: Subject to any disclaimer, the term of this patent is extended or adjusted under 35 U.S.C. 154(b) by 1205 days.

(21) Appl. No.: 11/313,441

(22) Filed: Dec. 13, 2005

(65) Prior Publication Data

US 2007/0133763 A1 Jun. 14, 2007

(30) Foreign Application Priority Data

Sep. 20, 2005 (EP) .................................. 05425657
Sep. 20, 2005 (IT) .............................. MI2005A1742

(51) Int. Cl.
*H04M 11/00* (2006.01)
(52) U.S. Cl. ........... 713/166; 709/203; 709/217; 705/34
(58) Field of Classification Search .................. 713/166
See application file for complete search history.

(56) References Cited

U.S. PATENT DOCUMENTS

| | | | | | |
|---|---|---|---|---|---|
| 4,633,245 | A | * | 12/1986 | Blount et al. | 340/2.1 |
| 4,907,260 | A | * | 3/1990 | Prohs et al. | 379/224 |
| 5,883,946 | A | * | 3/1999 | Beck et al. | 379/201.12 |
| 5,905,715 | A | * | 5/1999 | Azarmi et al. | 370/244 |
| 5,910,984 | A | * | 6/1999 | Low | 379/279 |
| 5,954,799 | A | * | 9/1999 | Goheen et al. | 709/250 |
| 5,995,610 | A | * | 11/1999 | Smidt et al. | 379/207.02 |
| 6,002,756 | A | * | 12/1999 | Lo et al. | 379/201.03 |
| 6,026,424 | A | | 2/2000 | Circenis | |
| 6,076,093 | A | * | 6/2000 | Pickering | 707/104.1 |
| 6,122,363 | A | * | 9/2000 | Friedlander et al. | 379/230 |
| 6,140,586 | A | * | 10/2000 | Imani | 174/72 C |
| 6,229,883 | B1 | * | 5/2001 | Kakizaki et al. | 379/142.04 |
| 6,282,683 | B1 | * | 8/2001 | Dapper et al. | 714/746 |
| 6,453,356 | B1 | | 9/2002 | Sheard et al. | |
| 6,775,262 | B1 | * | 8/2004 | Skog et al. | 370/349 |
| 6,807,181 | B1 | * | 10/2004 | Weschler | 370/400 |
| 6,910,074 | B1 | | 6/2005 | Amin et al. | |
| 6,985,569 | B2 | * | 1/2006 | Baker | 379/126 |

(Continued)

FOREIGN PATENT DOCUMENTS

EP 0980175 A2 2/2000

(Continued)

OTHER PUBLICATIONS

Translation of Japanese Examination Report, dated Sep. 16, 2008, Japanese Pat. App. No. 2006-319265.

(Continued)

*Primary Examiner* — Kambiz Zand
*Assistant Examiner* — Yonas Bayou
(74) *Attorney, Agent, or Firm* — Brinks Hofer Gilson & Lione

(57) ABSTRACT

A telecommunications architecture exposes telecommunications services to third parties through a secure access gateway. The third parties may be other telecommunications service providers who employ the services to support their own products and services. The access gateway provides a secure, standardized, and controlled access platform for the exposed services, and addresses the technical problems associated with such access. In addition to providing technical solutions for efficient and secure access to exposed services, the architecture also provides an additional revenue channel for existing telecommunication service providers.

25 Claims, 22 Drawing Sheets

U.S. PATENT DOCUMENTS

| | | | |
|---|---|---|---|
| 7,222,088 B2 | 5/2007 | Nishikado et al. | |
| 7,552,323 B2 | 6/2009 | Shay | |
| 2002/0035617 A1 | 3/2002 | Lynch et al. | |
| 2002/0156874 A1 | 10/2002 | Suorsa et al. | |
| 2002/0168962 A1 | 11/2002 | Kurakake et al. | |
| 2003/0065777 A1* | 4/2003 | Mattila et al. | 709/225 |
| 2003/0154179 A1 | 8/2003 | Mercer | |
| 2003/0172272 A1* | 9/2003 | Ehlers et al. | 713/170 |
| 2004/0015366 A1 | 1/2004 | Wiseman et al. | |
| 2004/0088417 A1 | 5/2004 | Bober et al. | |
| 2004/0111506 A1* | 6/2004 | Kundu et al. | 709/223 |
| 2004/0013486 A1 | 7/2004 | Markki et al. | |
| 2004/0133486 A1* | 7/2004 | Markki et al. | 705/34 |
| 2004/0133627 A1 | 7/2004 | Kalyanaraman et al. | |
| 2004/0139166 A1 | 7/2004 | Collison | |
| 2004/0153404 A1 | 8/2004 | Rischmueller et al. | |
| 2004/0249910 A1* | 12/2004 | Jerbi et al. | 709/222 |
| 2005/0038869 A1* | 2/2005 | Zimler et al. | 709/217 |
| 2005/0073999 A1 | 4/2005 | Koch | |
| 2005/0091370 A1 | 4/2005 | Wietfeld | |
| 2005/0149724 A1* | 7/2005 | Graff | 713/156 |
| 2005/0160135 A1* | 7/2005 | Yokoro | 709/200 |
| 2005/0175021 A1* | 8/2005 | Ozugur et al. | 370/401 |
| 2005/0185661 A1 | 8/2005 | Scott et al. | |
| 2006/0026108 A1 | 2/2006 | Wilson et al. | |
| 2006/0101474 A1 | 5/2006 | Magown | |
| 2006/0209768 A1 | 9/2006 | Yan et al. | |
| 2007/0047533 A1 | 3/2007 | Criddle et al. | |
| 2007/0050340 A1 | 3/2007 | von Kaenel et al. | |
| 2007/0118648 A1 | 5/2007 | Millefiorini et al. | |
| 2007/0240046 A1 | 10/2007 | Yan et al. | |
| 2007/0242819 A1 | 10/2007 | Bozionek et al. | |
| 2007/0274291 A1 | 11/2007 | Diomelli | |
| 2008/0077680 A1 | 3/2008 | Dellarole et al. | |

FOREIGN PATENT DOCUMENTS

| | | |
|---|---|---|
| EP | 1 052 841 A2 | 11/2000 |
| EP | 1 418 743 A1 | 5/2004 |
| JP | 11-219340 A | 8/1999 |
| JP | 2002-140309 A | 5/2002 |
| JP | 2003-060714 A | 2/2003 |
| JP | 2004-260240 A | 9/2004 |
| JP | 2004-266310 A | 9/2004 |
| JP | 2005-202631 | 7/2005 |
| JP | 2006-504297 A | 2/2006 |
| JP | 2006-510328 A | 3/2006 |
| WO | WO 02/91194 A1 | 11/2002 |
| WO | WO 03/025809 A2 | 3/2003 |

OTHER PUBLICATIONS

Indian Examination Report, dated Sep. 29, 2008, Indian Pat. App. No. 1722/MUM/2006.
EPO Examination Report, dated May 19, 2006, EP Pat. App. No. 05425821.5.
EPO Examination Report, dated May 10, 2006, EP Pat. App. No. 05425824.9.
Silver et al., "Unified Network Presence Management," White Paper Nortel Networks, 2000, 6 pages.
Anonymous, "3GPP; Technical Specification Group Services and System Aspects; Presence Service; Architecture and Functional Description," 3GPP TS 23.141 V6.0.0, Oct. 2002, 31 pages.
Livingston et al., "Remote Authentication Dial in User Service (RADIUS)," Radius Working Group, Internet-Draft, Feb. 2000, 80 pages.
Droms, "Dynamic Host Configuration Protocol," Oct. 2003, available from http://www.ietf.org/rfc/rfc1541.txt, 40 pages.
The prosecution history of U.S. Appl. No. 11/314,577 shown in the attached Patent Application Retrieval file wrapper document list, printed Nov. 25, 2008.
The prosecution history of U.S. Appl. No. 11/313,463 shown in the attached Patent Application Retrievel file wrapper document list, printed Nov. 13, 2008.
The prosecution history of U.S. Appl. No. 11/313,496 shown in the attached Patent Application Retrieval file wrapper document list, printed Nov. 13, 2008, including each substantive Office Action.
The prosecution history of U.S. Appl. No. 11/313,497 shown in the attached Patent Application Retrieval file wrapper document list, printed Nov. 13, 2008.
The prosecution history of U.S. Appl. No. 11/314,576 shown in the attached Patent Application Retrieval file wrapper document list, printed Nov. 13, 2008.
Nokia "Parameters in Subscriber Certificate and Subscriber Profile Supporting Operator Control and Service Differentiation", 4pp., 3GPP TSG SA WG 3 Security, Feb. 25-28, 2003, Sophia Antipolis, France.
Dr. Bert Dempsey and Dr. Matthew Lucas, "IPDR Update: Standards Effort Moves From Usage to Provisioning", pp. 44-48, TelOSSource Magazine, Apr. 2000.
Sun Microsystems, Chapter 8, Authentication Options, Sun Java System Access Manager 6 2005Q1 Adminstration Guide, Sun Microsystems, pp. 1-25, Mar. 2005.
Opencon, "White Paper on Billing for the New Public Network", pp. 1-5, OpenCon Systems, Inc., www.opencon.com, 2000.
The Parlay Group, Inc., The Parlay Goup: Web Services Working Group, "Parlay Web Services Application Deployment Infrastructure", pp. 1-21, Version 1.0, Oct. 31, 2002.
Michel L.F. Grech et al., "Delivering Searmless Services in Open Networks Using Intelligent Service Mediation", pp. 186-202, Bell Labs Technical Journal, Jul.-Sep. 2000.
Office Action, mailed Jun. 22, 2010, for commonly owned U.S. Appl. No. 11/313,497.
Japanese Office Action for JP-2006-284334, Dispatch Date Jan. 25, 2010, with English translation, 5 pgs.
Japanese Office Action for JP-2006-284333, Dispatch Date Jun. 28, 2010, with English translation, 30 pgs.
Office Action mailed Aug. 20, 2010, for commonly owned U.S. Appl. No. 11/313,497.
Office Action, mailed Jun. 23, 2010, for commonly owned U.S. Appl. No. 11/585,612.
Office Action, mailed Aug. 20, 2010, for commonly owned U.S. Appl. No. 11/313,497.
The prosecution history of U.S. Appl. No. 11/585,612 shown in the attached Patent Application Information Retrieval file wrapper document list, printed Nov. 3, 2010, including each substantive office action.
Extended European Search Report, dated Oct. 8, 2010, for co-pending European Patent Application No. 05425657.3, 4 pages.
Canadian Office Action, dated Aug. 4, 2010, for co-pending Canadian Patent Application No. 2,559,647, 5 pages.

* cited by examiner

SMS Request   900

| Field | | Type |
|---|---|---|
| Transaction ID | 902 | String |
| Message Type | 904 | String |
| SMS Version | 906 | String |
| Sender Address | 908 | String |
| To Address | 910 | String Sequences |
| CC Address | 912 | String Sequences |
| BCC Address | 914 | String Sequences |
| Service Code | 916 | String |
| Time of Request | 918 | Date Time |
| Time of Expiry | 920 | Date Time |
| Earliest Delivery Time | 922 | Date Time |
| Priority | 924 | String |
| Subject | 926 | String |
| Charged Party | 928 | String |
| Content | 930 | String |

Figure 9

| Wrapped SMS Request | | 1000 |
|---|---|---|

| Field | | Type |
|---|---|---|
| TSOID | 1002 | String |
| TSOLABEL | 1004 | String |
| Service Type | 1006 | String |
| Sender Address | 1008 | String |
| To Address | 1010 | String Sequences |
| CC Address | 1012 | String Sequences |
| BCC Address | 1014 | String Sequences |
| Service ID | 1016 | String |
| Start Date | 1018 | Date Time |
| End Date | 1020 | Date Time |
| Priority | 1022 | String |
| Subject | 1024 | String |
| Account ID | 1026 | String |
| Message Body | 1028 | String |

Figure 10

SMS Response     1100

| Field | | Type |
|---|---|---|
| TSOID | 1102 | String |
| TSOLABEL | 1104 | String |
| TSO Result: Status Code | 1106 | Integer |
| TSO Result: Error Code | 1108 | String |
| TSO Result: Error Desc | 1110 | String |

Figure 11

| Wrapped SMS Response | 1200 |

| Field | | Type |
|---|---|---|
| TSOID | 1202 | String |
| Message Type | 1210 | String |
| SMS Version | 1212 | String |
| TSO Result: Status Code | 1204 | Integer |
| TSO Result: Error Code | 1206 | String |
| TSO Result: Error Desc | 1208 | String |

Figure 12

AUTHENTICATION AND AUTHORIZATION ARCHITECTURE FOR AN ACCESS GATEWAY

PRIORITY CLAIM

This application claims the priority benefit of EPO Application No. 05425657.3 filed Sep. 20, 2005, and Italian Application No. MI2005A001742 filed Sep. 20, 2005, both of which are incorporated herein by reference in their entirety.

BACKGROUND OF THE INVENTION

1. Technical Field

This invention relates to telecommunications processing system architectures. In particular, this invention relates to providing secure and controlled third party access to telecommunication service provider functionality.

2. Related Art

Rapid advances in data processing and telecommunications technology have lead to a vast array of communication services available to the consumer. Such telecommunications services include traditional telephone service, Internet service, cable television service, cellular phone service, paging service, combined voice and data delivery service, and many other services. Furthermore, many services may be either wireless or wireline based.

Established telecommunications service providers have invested enormous amounts of time, money, and advanced technology to implement and reliably provide a broad spectrum of telecommunication products and services. In the past, this investment has been of primary benefit only to the telecommunications service provider. That is, the telecommunications service providers internally maintained their own technologies in confidence and for their own use.

Against this backdrop of sophisticated telecommunications architectures is the desire within each telecommunications service provider to explore and develop new business opportunities which lead to new revenue channels. Existing technology in the service provider architectures could drive such new revenue channels. However, in the past there was no sufficiently secure, flexible, and efficient mechanism which allowed third parties to access underlying functionality in service provider architectures.

A need has long existed for enhanced telecommunications service provider architectures.

SUMMARY

Establishing enhanced telecommunications service provider architectures for third party access poses significant technical challenges. As examples, there is a technical challenge in providing an architecture which provides secure and controlled access to internal functionality. Another technical challenge lies in providing a database data model architecture which efficiently flexibly supports independent authorization criteria for multiple different types of service requesters. The service requesters may vary widely, from individual end-users to company applications which issue service requests.

One aspect of the invention is an access gateway for a telecommunications architecture. The gateway provides the access point between a telecommunications service provider and third parties who issue requests to use the functionality implemented at the service provider. The gateway protects the telecommunications service provider against unauthorized access while exposing available services, and authenticating, authorizing, and processing third party requests for exposed services.

The gateway implements several interfaces between third parties and the underlying telecommunications service functionality. A subscriber communication interface receives, for example, third party communication network access requests (e.g., HTTP requests for web site content). An application interface receives, as examples, third party requests for exposed services such as short message service (SMS), multimedia message service (MMS), Charge services, and other exposed services.

The third party gateway includes a service request handler. The service request handler receives the communication network access request through the subscriber communication interface. The service request handler extracts a subscriber device identifier (e.g., an MSISDN associated with a subscriber device such as a cell phone) from the communication network access request and searches a profiling database for a record of the subscriber device identifier. When an authorized record exists, the service request handler forwards the communication network access request to a communication network service provider through the service provider communication interface.

The gateway distinguishes communication network access requests from exposed service requests. To that end, the gateway provides a capability hander which receives an exposed service request from a third party through the application interface. The capability handler may then extract a secure certificate identifier from the exposed service request and search the profiling database to authorize the third party application associated with the certificate identifier.

After authorizing the third party application to use the exposed service, the capability handler maps the exposed service request to form an input message as expected by the telecommunications service provider. For example, the capability handler may wrap the exposed service requests for delivery to a service broker in the telecommunications architecture through a service broker communication interface. The capability handler may provider wrappers for SMS requests, MMS request, Session Initiation Protocol (SIP) requests, Charge requests or any other request for an exposed service.

Another aspect of the invention is a profiling database and data model which support particularly efficient establishment and authorization of multiple types of service requesters. The data model provides a root node (e.g., a company table) to which multiple types of service requesters are related. From the root node the data model establishes independent branches for requesters of different types of services, such as network communication requesters and exposed service requesters.

Thus, one company may provide employees with cell phones which request network communication service (e.g., Internet browsing service) as well as establish company applications (e.g., a SMS front end) which submit requests for an exposed SMS service. Different types of authorization data may be established along each branch to selectively tailor authorization appropriately to the type of service requester. Furthermore, the data model establishes status identifiers at multiple levels within each branch. Accordingly, the access gateway may flexibly establish and apply authorization criteria not only for each type of service requester, but also for the individual service requesters within each type.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like referenced numerals designate corresponding parts or elements throughout the different views.

FIG. 9 shows an SMS exposed service request.

FIG. 10 shows a wrapped SMS service request.

FIG. 11 shows an SMS service request response.

FIG. 12 shows a wrapped SMS service request response.

DETAILED DESCRIPTION OF THE PREFERRED EMBODIMENTS

The elements illustrated in the Figures interoperate as explained in more detail below. Before setting forth the detailed explanation, however, it is noted that all of the discussion below, regardless of the particular implementation being described, is exemplary in nature, rather than limiting. For example, although selected aspects, features, or components of the implementations are depicted as being stored in memories, all or part of systems and methods consistent with the third party access gateway and its underlying components may be stored on, distributed across, or read from other machine-readable media, for example, secondary storage devices such as hard disks, floppy disks, and CD-ROMs; a signal received from a network; or other forms of ROM or RAM either currently known or later developed.

Furthermore, although specific components of the third party access gateway architecture will be described, methods, systems, and articles of manufacture consistent with the third party access gateway architecture may include additional or different components. For example, a processor may be implemented as a microprocessor, microcontroller, application specific integrated circuit (ASIC), discrete logic, or a combination of other type of circuits or logic. Similarly, memories may be DRAM, SRAM, Flash or any other type of memory. Flags, data, databases, tables, and other data structures may be separately stored and managed, may be incorporated into a single memory or database, may be distributed, or may be logically and physically organized in many different ways. Programs may be parts of a single program, separate programs, or distributed across several memories and processors. Systems may be implemented in hardware, software, or a combination of hardware and software in one processing system or distributed across multiple processing systems.

Figure 1:
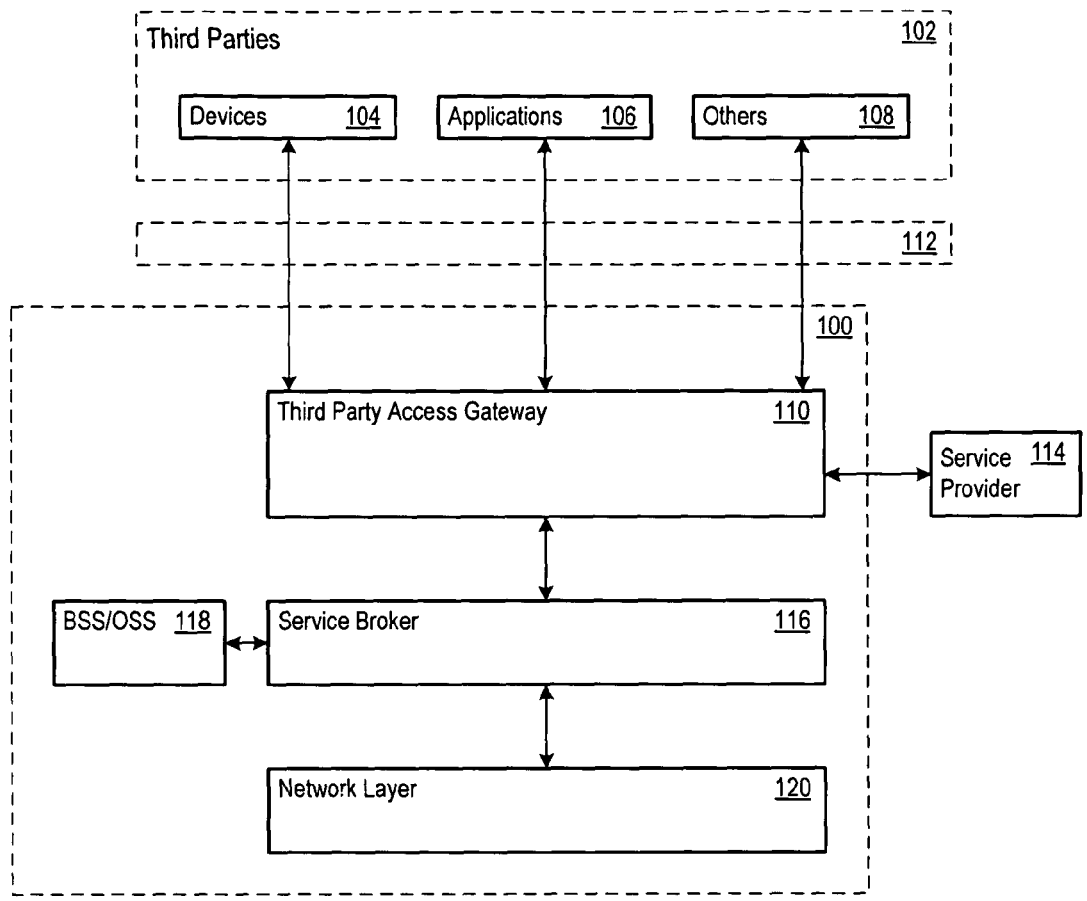
FIG. 1 shows a portion of a telecommunications architecture which includes a third party access gateway.

FIG. 1 shows a portion of a telecommunications architecture 100 which interacts with third parties 102. The third parties 102 may vary widely in form and in implementation. As examples, the third parties 102 may include: subscriber devices 104 such as cellular phones, personal data assistants, network (e.g., Internet) communication devices; applications 106 such as telecommunications service applications implemented by other service providers, such as Short Message Service (SMS) messaging applications, Session Initiation Protocol (SIP) systems, and billing applications which charge customers for products and services; and other devices, programs, or entities 108.

The telecommunications architecture 100 implements functionalities which support telecommunications products and services. In addition, as will be explained in more detail below, the telecommunications architecture 100 exposes selected functionalities to the third parties 102. In other words, the third parties 102 may communicate with the telecommunications architecture 100 to use the functionalities already in place in the architecture 100. In other words, the third parties 102 need not expend the resources required to locally duplicate the functionalities already provided by the telecommunications architecture 100.

The products and services, and their exposed underlying functionalities, may vary between implementations. As examples, the telecommunications architecture 100 may expose SMS messaging services (to deliver and charge for an SMS message), Multimedia Messaging System (MMS) messaging services (to deliver and charge for an MMS message), and SIP services (to setup a SIP call and charge for the call). As additional examples, the telecommunications architecture 100 may expose Charge services (to request to bill a charge against an account), Internet Protocol Television (IPTV) services (to request delivery of television programming), User Status services (to request a current user status, such as 'online', 'offline', 'busy', or 'away'), and user authentication services (e.g., to request verification of whether a mobile user exists and whether the mobile user has the credentials to purchase a desired service, such as IPTV service). Other functionalities may be provided in addition or as alternatives. Furthermore, the telecommunications architecture 100 and may also provide access to communication network services (e.g., Internet browsing services) through the third party access gateway 110.

The telecommunications architecture 100 secures access to the exposed services. To that end, the architecture 100 provides a third party access gateway 110. The third party access gateway 110 acts as a single point of contact for the third parties 102 to the exposed services.

As shown in FIG. 1, the third party access gateway 110 receives service requests 112 from the third parties 102. In response, the third party access gateway 110 verifies that the service request originates with an authenticated and authorized third party. In the case of network communication service requests (as one example), the third party access gateway 110 processes authorized service requests and relays the service requests to service providers 114. In the case of exposed service requests, such as SMS, MMS, and SIP service requests, the third party access gateway 100 may process and relay the authorized service requests to the service broker 116.

The service broker 116 executes the service request. In doing so, the service broker 116 may communicate with Business Support Systems (BSS) and Operation Support Systems (OSS) 118 which the architecture 100 implements to create, deploy, manage, and maintain telecommunications products and services. In executing the service request, the service broker 116 may additionally or alternatively communicate with a network layer 120 which may deliver or return service related data to the service broker 116. Responses from service providers 114 and the service broker 116 are returned to the third-party access gateway 110 for delivery to the originating third party requester.

The third party access gateway 110 thereby provides a security layer between the third parties 102 and the exposed functionality implemented in the telecommunications architecture 100. The third party access gateway 110 allows third parties to develop, deploy, deliver, and manage a wide range of products and services using functionality already implemented in another telecommunications architecture. At the same time, the third party access gateway 110 allows the telecommunications architecture 100 to expose core functionality toward the third parties 102 and a secure, standardized, and controlled manner.

Figure 2:
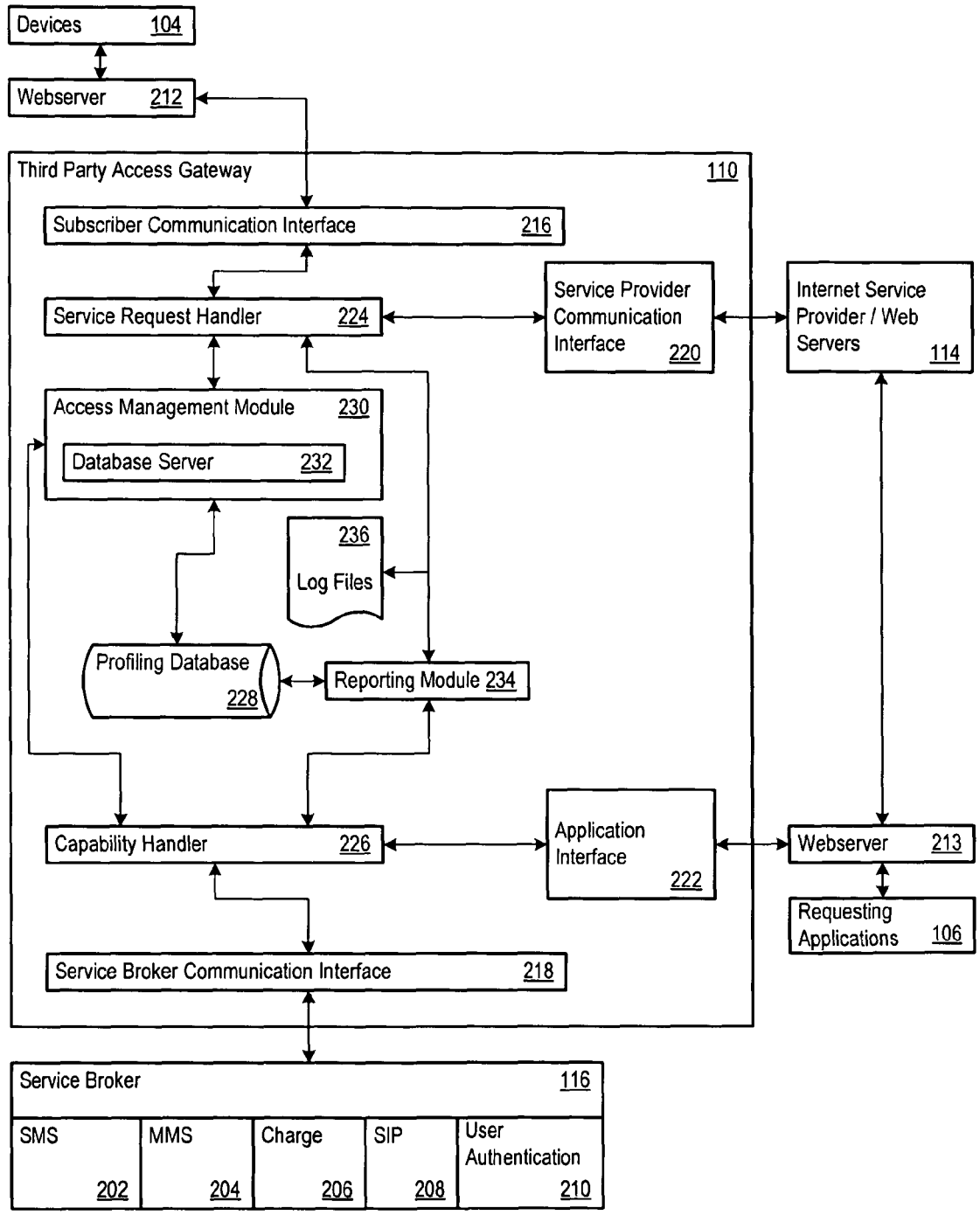
FIG. 2 shows a third party access gateway in communication with a service broker and with external devices, applications, and service providers.

FIG. 2 shows a more detailed view of the third-party access gateway 110. The third-party access gateway 110 communicates with the subscriber devices 104, the service providers 114 and the requesting applications 106. The third-party gateway 110 also communicates with the service broker 116. FIG. 2 shows that the service broker 116 accepts service requests for several exposed services: SMS services 202, MMS services 204, Charge services 206, SIP services 208, and User Authentication services 210.

Optionally, the subscriber devices 104, service providers 114, and requesting applications 106 may communicate with the third-party access gateway 110 through intermediaries. As one example, the intermediaries may include web servers, such as the web server 212 and web server 213. The intermediaries may implement encrypted or otherwise secure communication links between the third-party access gateway 110 and the subscriber devices 104, service providers 114, and requesting applications 106. For example, the intermediaries (or the third party gateway 110 itself) may implement secure socket protocols (such as the HTTPS protocol), with accompanying SSL certificates and certificate identifiers which provide authentication and which convey public keys components of public key encryption pairs of private keys and a public keys. The web servers 212 and 213 and the gateway 110 may then authorize the third parties 102 using client certificates and the authorization information stored in the profiling database 228.

The third-party access gateway 110 communicates through several interfaces. The interfaces include a subscriber communication interface 216 and a service broker communication interface 218. The interfaces also include a service provider communication interface 220 and an application interface 222.

The interfaces 216-222 may be implemented in many ways. As one example, the interfaces 216-222 may be network sockets defined by IP addresses, port numbers, and communication protocols, with a supporting physical layer (e.g., one or more network interface cards). The interfaces 216-222 may communicate through the physical layer using interprocess communication, messaging, or signaling, using HTTP, the Simple Object Access Protocol (SOAP), Java Database Connectivity (JDBC), or other communication protocols. The messages may be encoded in network packets (e.g., TCP/IP packets) in any desired form, such as eXtensible Markup Language (XML) messages. Furthermore, a firewall may be established to block requests from unknown hosts.

The third party access gateway 110 includes two message handlers which handle service requests. A service request handler 224 receives and processes communication network access requests such as Internet browsing requests, web server information requests, or other network access requests. A capability hander 226 receives and processes exposed service use requests, such as SMS service requests or Charge service requests.

Summarizing the processing of a communication network access request, the service request handler 224 receives the request, extracts a subscriber device identifier (e.g., an MSISDN identifier), and searches the profiling database 228 for verification information (e.g., a matching Active MSISDN record) which may correspond to any given subscriber device. When the verification information is located, the service request handler 224 maps the request to a service provider 114 through the service provider communication interface 216. The service provider 114 responds with the requested data. In turn, the service request handler 224 returns the data to the requester through the subscriber communication interface 216.

Summarizing the processing of an exposed service request, the capability handler 226 receives the request, optionally including a digital certificate issued by a certificate authority. The capability handler 226 authenticates the requester based on the digital certificate. The capability handler 226 may also extract a certificate identifier (e.g., a public key or a subject unique identifier), and searches the profiling database 228 for a requester application matching the certificate identifier. The capability handler 226 may also determine whether a matching requester application has an Active status (or other status indicating that the application is authorized to request the service) for one or more services.

When an authorized requester application is authenticated and authorized for the requested service, the capability handler 226 wraps the request for downstream processing, and forwards the wrapped request the service broker 116. The service broker 116 provides an acknowledgment to the capability handler 226 and initiates execution of the request for the exposed service for the authorized requester application. Accordingly, as examples, an authorized requester application may send and charge for an SMS message or MMS message, setup a SIP connection, submit a Charge against a customer account or employ any other services exposed in the architecture 100.

The service request handler 224 and the capability handler 226 authorize the service use requests. To that end, the service request handler 224 and the capability handler 226 consult the profiling database 228. As will be explained in more detail below, the profiling database 228 holds authorization information for service requesters. An access management module 230 may interface the profiling database 228 and the service request handler 224 to the capability handler 226 (or any other program or entity in the third-party access gateway 110). As an example, the access management module 230 may implement a database sever 232 including a database search engine. To that end, the access management module 230 and the profiling database 228 may be built on an Oracle™, Microsoft™ SQL, or other third party database server platform.

The third-party access gateway 110 further includes the reporting module 234. The reporting module 234 obtains service request processing records from the service request handler 224 and the capability handler 226. The reporting module 234 obtains the service log files 236 (e.g., through an FTP connection with systems which implement the service request handler 224 and/or capability handler 226) and processes the log files 236 to update log tables in the profiling database 228, as described in more detail below.

Figure 3:
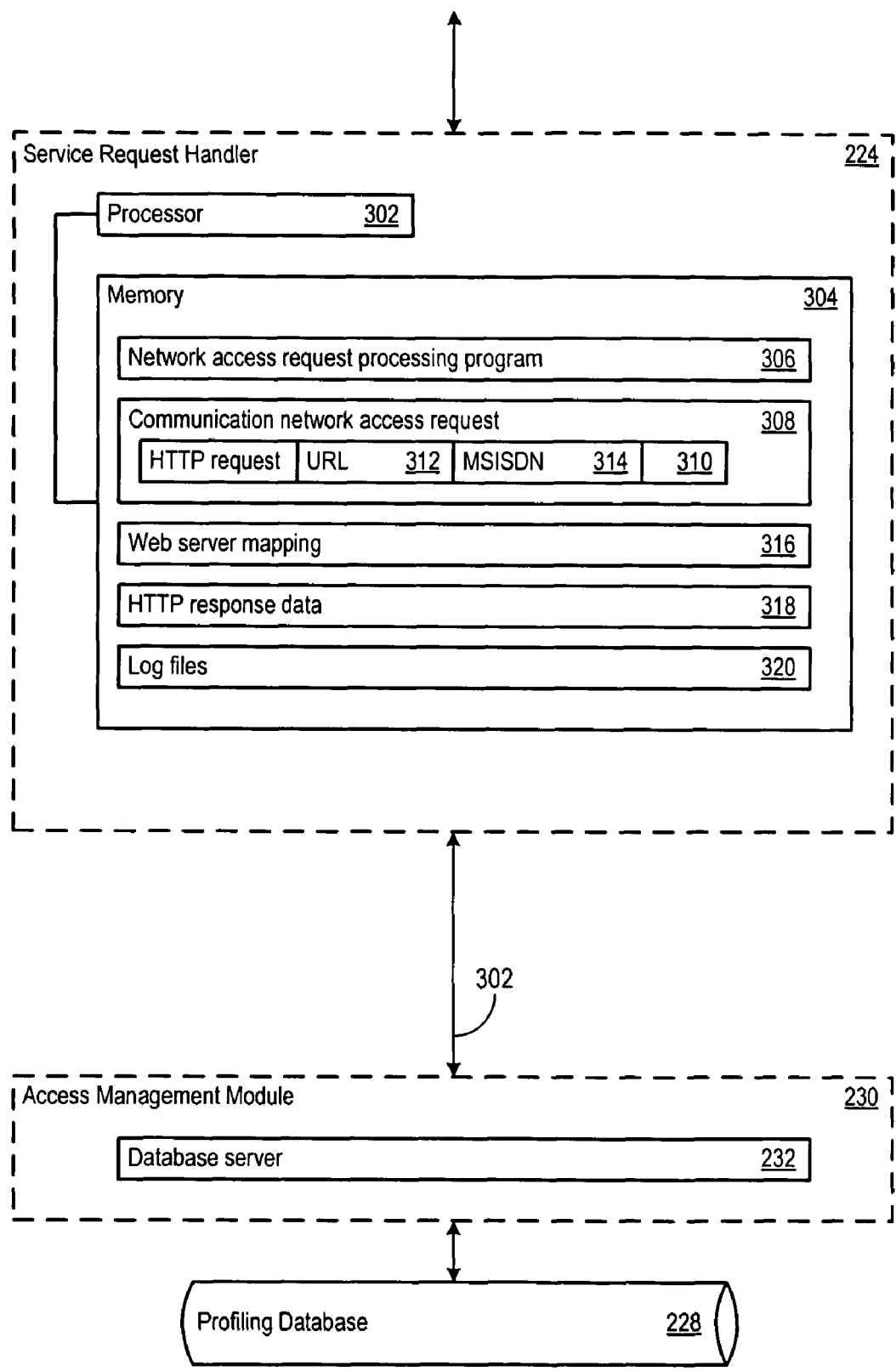
FIG. 3 shows a service request handler in communication with an access management module.

FIG. 3 shows additional detail of the service request handler 224. The service request handler 224 may be implemented in a general purpose processing architecture including a processor 302 and a memory 304. The memory 304 stores programs and data which provide the service request handler functionality, as explained below.

The processor 302 may be dedicated to service request handler functionality. For example, the service request handler 224 may be an independent processing system within the overall architecture of the third party gateway 110. In other implementations, the processor may be shared across additional programs and thus perform additional functionality in the third party gateway 110. As examples, the processor 302 may also perform the functions of the capability handler 226 and/or initiate reception and transmission of messages through the interfaces 216-222.

The memory 304 includes a network access request processing program 306. The processing program 306 processes communication network access requests 308 received, for example, through the subscriber communication interface 216. FIG. 3 shows an example in which the communication network access request 308 is a Hypertext Transfer Protocol (HTTP) request 310, including a Uniform Resource Locator (URL) 312 and an MSISDN 314.

The processing program 306 authorizes the network access request 308. In one implementation, the process program 306 extracts the MSISDN 314 from the request 308. The processing program 306 issues a request to the access management module 230 to search the profiling database 228 based on the MSISDN. The access management module 230 returns the search results to the processing program 306, which then determines whether an authorized record exists for the MSISDN.

For network access requests from authorized subscriber devices, the service request handler 224 determines a destination web server to handle the request. To that end, the network access request processing program 306 may establish and apply a web server mapping 316. The web server mapping 316 may associate available web servers (e.g., identified by name, IP address, and/or port number) to the MSISDN and/or to portions of the Uniform Resource Locator (URLs) or other data in the HTTP request. The service request handler 224 thereby determines which service provider 114 will handle the network access request 308.

The selected service provider 114 responds to the access request 308 with the requested data. FIG. 3 shows an example in which the service provider 114 responds to the HTTP request 308 with HTTP response data 318. The response data 318 may include HTML, image, sound, and/or movie data, or any other data responsive to the HTTP request 308. The service request handler 224 returns the HTTP response data 318 to the authorized requester.

The service request handler 224 may also create log files 320. The log files 320 may include any desired service tracking information for each service request. The logged information may include authorized subscriber information, MSISDNs, service request dates and times, URL data, amount of data transferred, identifiers of the responsive service providers, error codes, transaction identifiers, and other information. The service request handler 224 may provide the log files 320 to the reporting module 234 for parsing and populating log tables in the profiling database 228.

Figure 4:
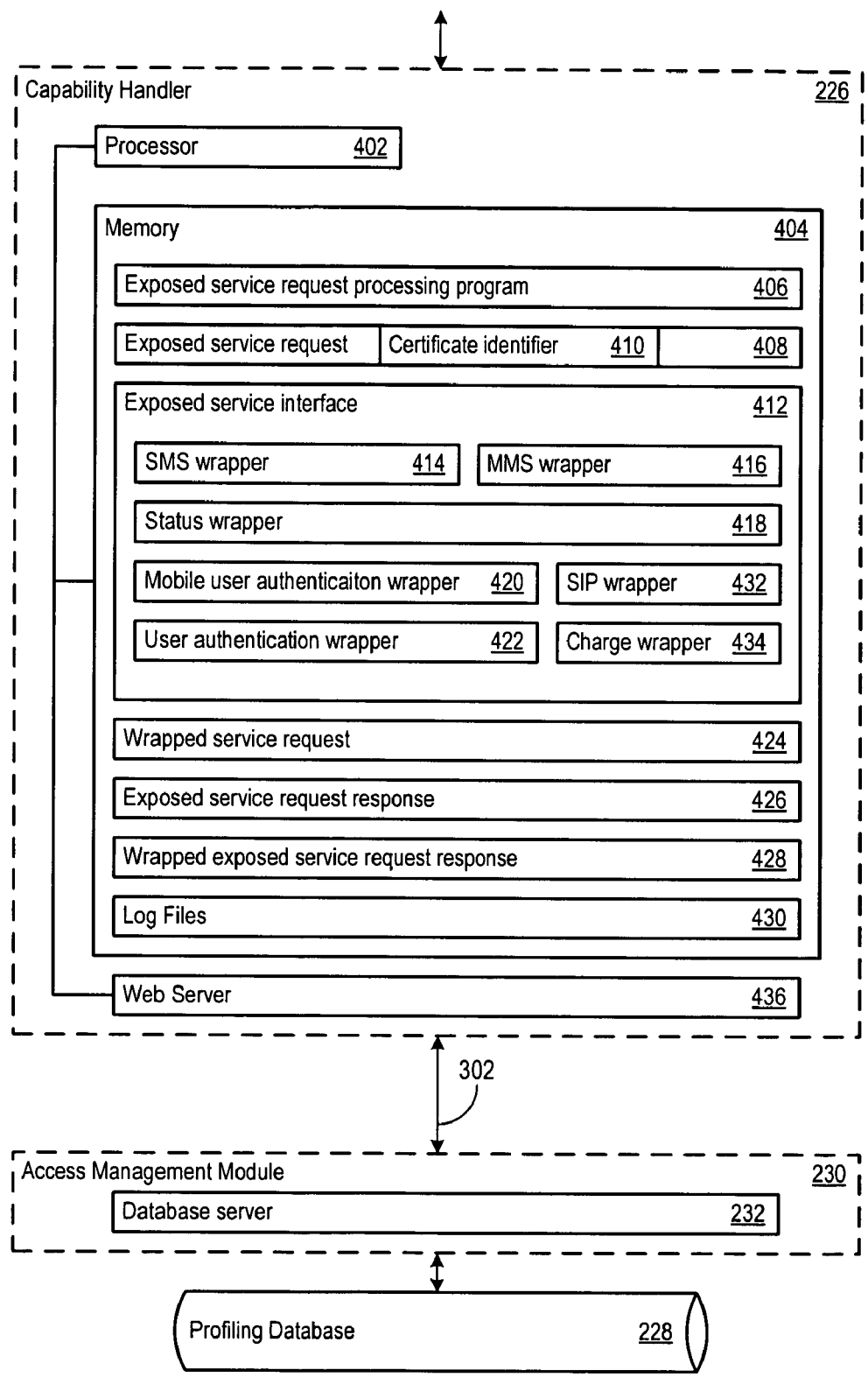
FIG. 4 shows a capability handler in communication with an access management module.

FIG. 4 shows additional detail of the capability handler 226. The capability handler 226 may be implemented in a general purpose processing architecture including a processor 402 and a memory 404. The memory 404 stores programs and data which provide the capability handler functionality, as explained below. A webserver 436 (e.g., an Apache Axis webserver) may provide third party authentication based on client certificates and a secure communication channel through SSL.

The capability handler 226 may be an independent processing system within the overall architecture of the third party gateway 110. In other implementations, the processor 402 may be shared across additional programs and perform additional functionality in the third party gateway 110. As examples, the processor 402 may also execute the functions of the service request handler 224 and/or initiate reception and transmission of messages through the interfaces 216-222.

The memory 404 includes an exposed service request processing program 406. The processing program 406 processes exposed service requests 408 received, for example, through the application interface 222. The service request 408 shown in FIG. 4 includes a certificate identifier 410 (e.g., a public key or subject unique identifier) which may be present in a digital certificate included with the service requests 408. The processing program 406 may authenticate the exposed service request 408 by first decoding the digital certificate and verifying issuance of the certificate with by a certificate authority. The processing program 406 may then employ the verified public key to authenticate the service request 408 (e.g., by comparing a decrypted message hash value with a calculated message hash value). Alternatively, the capability handler 226 may employ the web server 426 for authentication.

In one implementation, the processing program 406 extracts the certificate identifier 410 from the request 408. The processing program 406 issues a request to the access management module 230 to search the profiling database 228 based on the certificate identifier 410. The access management module 230 returns the search results to the processing program 406. In turn, the processing program 406 determines whether an authorized company application exists corresponding to the certificate identifier 410 and that is linked to an Active (or otherwise authorized) installed service corresponding to the requested service.

For exposed service requests from authenticated and authorized applications, the capability handler 226 determines which exposed service has been requested. The service type may be specified in the service request 408, or the service request may be distinguished based on the specific endpoints within the third party gateway 110 to which they are sent. Each service request 408 may vary in form and content depending on the type of exposed service which is requested.

The third party gateway 110 may define and publish Web Services Description Language (WSDL) descriptors for exposed services to the third parties 102. WSDL descriptors may specify the location of a service (e.g., the network address of an endpoint establishes in the third party access gateway 110) and the functionality which the service exposes. The WSDL descriptors may also define each exposed service, the operations which may be performed, and the messages that are involved. Accordingly, the third parties 102 receive the published descriptors and understand where to communicate service requests, the form and content that the service request should adhere to, and the form and content of responses that may be expected.

The capability handler 226 provides an exposed service interface 412 which acts an intermediary between the service broker 116 and the requesting applications 106. The exposed service interface 412 may translate received service request messages 408 from a form expected by the third party gateway 110 (e.g., the form for input messages specified in the WSDL descriptor) to a form expected by the service broker 116 for such requests. In other words, the wrappers are the mapping applied by WSDL definitions to form input messages for the exposed services. Thus, the exposed service interface 412 insulates the service broker 116 from the potentially widely varying form and content of exposed service requests messages and efficiently connects requesting applications to the exposed services.

To that end, the exposed service interface 412 may include wrapper logic which prepares a standardized (i.e., wrapped) exposed service request 424 for the service broker 116. The wrapper logic may represent a processing program which parses the WSDL definition to translate the received message form and content to match the message definitions specified in the WSDL definitions. Examples of message formats expected by the service broker 116 are described below.

Wrapper logic may be provided for any of the exposed services. FIG. 4 shows an SMS wrapper 414, an MMS wrapper 416, and a Status Inquiry wrapper 418. FIG. 4 also shows a Mobile User Authentication wrapper 420, a User Authentication Wrapper 422, a SIP wrapper 432 and a Charge wrapper 434.

In one implementation, the exposed service interface 412 may employ Java Remote Method Invocation (RMI). RMI provides a mechanism through which Java objects may be defined, and their method invoked remotely. To that end, the service broker 116 may act as an object server to create objects which handle exposed service requests. The objects may be registered so that the capability handler 226 may obtain references to the objects and invoke the objects remotely. The third party gateway 110 may send and receive wrapped service request messages and responses to and from the service broker 116 with other message communication and remote procedure call techniques, however.

The capability handler 226 obtains service request responses 426 to the exposed service requests from the service broker 116. The capability handler 226 provides the request responses 426 to the requesting applications. In addition, the capability handler 226 may provide a standardized response format for each exposed service request response. To that end, the wrappers shown in FIG. 4 may generate wrapped exposed service request responses 428 according to the output messages defined in the WSDL definitions.

The capability handler 226 may also create log files 430. The log files 430 may include any desired exposed service tracking information, such as authorized subscriber information, certificate identifiers, service request dates and times, number of requests made, types of requests made, error codes, transaction identifiers, and other information. The capability handler 226 may provide the log files 430 to the reporting module 234 for parsing and for populating log tables in the profiling database 228.

Figure 5:
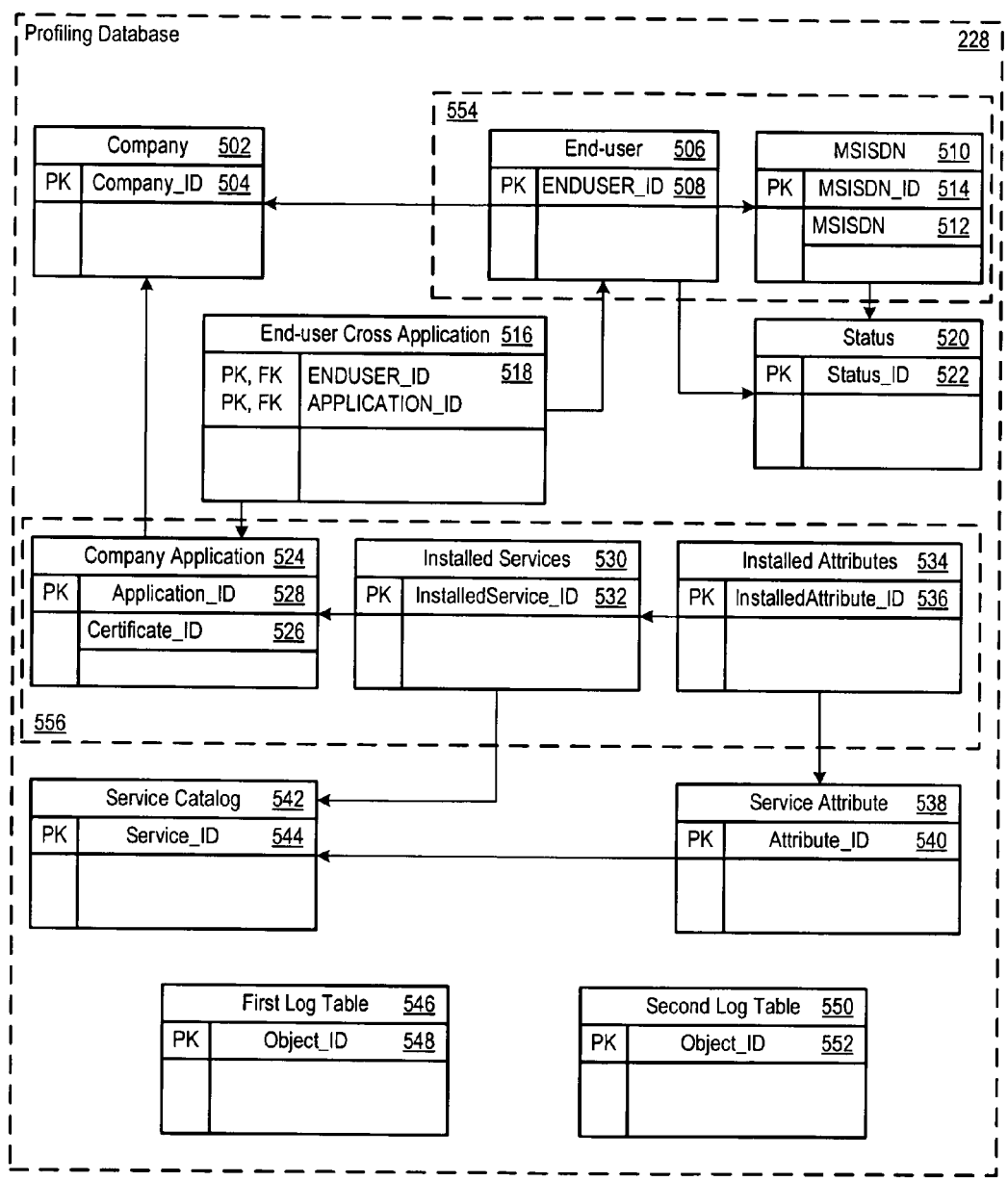
FIG. 5 shows a profiling database.

FIG. 5 shows an example implementation of the data model in the profiling database 228. The profiling database 228 includes a company table 502, which stores information characterizing a company which has access to one or more exposed services provided by the architecture 100. A company identifier field 504 provides a primary key to uniquely identify each record in the company table 502. The company table 502 is shown in more detail below in Table 1.

TABLE 1

Company

| Attribute Name | Attribute Description | Type |
|---|---|---|
| COMPANY_ID | Unique Identifier of the Company | Integer |
| MASTERPARTYID | AlphaNumeric descriptor of the Company | String |
| COMPANY_NAME | Company Name | String |
| VAT_CODE | Company Vat Code | String |
| FISCAL_CODE | Company Fiscal Code | String |
| STATUS_ID | Identifier of Company status (e.g., activated, deactivated) | Integer |
| CREATIONDATE | Creation Date | Date |
| LASTMODIFIEDDATE | Last Modified Date | Date |

An end-user table 506 stores information relating to the MSISDNs (which generally associate to specific individuals) which use network communication services and exposed services. The end-user table 506 establishes the relationships between the end user, their company, and their MSISDN. A primary key end user identifier field 508 uniquely identifies each record in the end-user table 506. The end-user table 506 is shown in more detail below in Table 2.

TABLE 2

End User

| Attribute Name | Attribute Description | Type |
|---|---|---|
| ENDUSER_ID | Unique Identifier of the EndUser | Integer |
| MSISDN_ID | Identifier of user MSISDN | Integer |
| SERVICE_PARTY_ID | AlphaNumeric descriptor of the EndUser | String |
| COMPANY_ID | Identifier of the Company | Integer |
| STATUS_ID | Identifier of EndUser status (e.g., activated, deactivated) | Integer |
| CREATIONDATE | Creation Date | Date |
| LASTMODIFIEDDATE | Last Modified Date | Date |

An MSISDN table 510 provides a device identifier table which establishes recognized MSISDNs in the MSISDN field 512. The MSISDN may be associated with subscriber devices, such as with GSM SIM cards for mobile phones. The end user table 506 may then relate an end user to an MSISDN using the MSISDN identifier field. That status field in the MSDISN table 510 provides a subscriber device status. A primary key is provided in the MSISDN identifier field 514 to uniquely identify each record in the MSISDN table 510. The MSISDN table 510 is shown in more detail below in Table 3.

TABLE 3

MSISDN

| Attribute Name | Attribute Description | Type |
| --- | --- | --- |
| MSISDN_ID | Unique Identifier of the MSISDN | Integer |
| MSISDN | MSISDN value | String |
| STATUS_ID | Identifier of MSISDN status (e.g., activated, deactivated) | Integer |
| CREATIONDATE | Creation Date | Date |
| LASTMODIFIEDDATE | Last Modified Date | Date |

A status table 520 establishes the possible statuses for end users, companies, MSISDNs, or other entities. A primary key status identifier field 522 uniquely identifies each record in the status table 520. The status table 520 is shown in more detail below in Table 4.

Examples of status include Active, Deactivated, Suspended, and Idle. Accordingly, the third party gateway 110 may set the status to one of many different levels. For example, the status may reflect the status of a company, a company application, a user, or a specific MSISDN. When authorizing service requests, the third party gateway 110 may check that the status is at any desired level before authorizing the request. For example, the third party gateway 110 may ensure that both an MDISDN and an end-user remain Active. Alternatively or additionally, the gateway 110 may ensure that the associated company also remains Active.

TABLE 4

Status

| Attribute Name | Attribute Description | Type |
| --- | --- | --- |
| STATUS_ID | Unique Identifier of the Status | Integer |
| STATUS_NAME | Name of the Status: Activated Deactivated Suspended Idle | String |
| STATUS_DESCRIPTION | Description of the Status | String |
| CREATIONDATE | Creation Date | Date |
| LASTMODIFIEDDATE | Last Modified Date | Date |

An end-user cross application table 516 establishes a relationship between an end user and the business applications they are subscribed to. End user identifier and application identifier fields provide primary key/foreign key fields 518 which link end users to company applications. The end-user cross application table 516 is shown in more detail below in Table 5.

TABLE 5

End user cross application

| Attribute Name | Attribute Description | Type |
| --- | --- | --- |
| ENDUSER_ID | Unique Identifier of the EndUser | Integer |
| APPLICATION_ID | Unique Identifier of the Application | Integer |
| CREATIONDATE | Creation Date | Date |
| LASTMODIFIEDDATE | Last Modified Date | Date |

A company application table 524 establishes the characteristics of an application within a company which may submit exposed service requests. The characteristics may include name, description, URL, a certificate identifier stored in the certificate identifier field 526, and other characteristics. As one example, the company application table may specify the characteristics of an SMS front end application running at a third party service provider, for example. The SMS front end may submit SMS requests to the third party gateway 110 on behalf of customers of the company associated with the SMS front end.

A primary key application identifier field 528 uniquely identifies each record in the company application table 524. In addition, a status identifier provides status information for each company application record. The company application table 524 is shown in more detail below in Table 6.

TABLE 6

Company Application

| Attribute Name | Attribute Description | Type |
| --- | --- | --- |
| APPLICATION_ID | Unique Identifier of the Application | Integer |
| APPLICATION_NAME | The name of the Application | String |
| APPLICATION_DESCRIPTION | The description of the Application | String |
| URL | The home URL of the Application | String |
| COMPANY_ID | Identifier of the Company | Integer |
| MSITE_URL_CATALOGUE | The URL of Application catalogue | String |
| CERTIFICATE_ID | Identifier of Application certificate | Integer |
| PROXY_HOST | IP of proxy server | String |
| PROXY_PORT | Port of proxy server | String |
| STATUS_ID | Identifier of Application status (e.g. activated, deactivated) | Integer |
| CREATIONDATE | Creation Date | Date |
| LASTMODIFIEDDATE | Last Modified Date | Date |

An installed services table 530 establishes records of the exposed services to which a company has subscribed. Thus, the installed services identify which exposed services the company applications may request. An installed service identifier field 532 serves as a primary key to uniquely identify each record in the installed services table 530. The installed services table 530 is shown in more detail below in Table 7.

TABLE 7

Installed Services

| Attribute Name | Attribute Description | Type |
| --- | --- | --- |
| INSTALLEDSERVICE_ID | Unique Identifier of the Installed Service | Integer |
| APPLICATION_ID | Identifier of the Application | Integer |
| SERVICE_ID | Identifier of the subscribed Service | Integer |
| STATUS_ID | Identifier of Installed Service status (e.g., activated, deactivated) | Integer |
| CREATIONDATE | Creation Date | Date |
| ENDDATE | Service Ending Date | Date |
| LASTMODIFIEDDATE | Last Modified Date | Date |

An installed attributes table 534 establishes characteristics of services associated with specific companies. An installed attributes identifier field 536 serves as a primary key to uniquely identify each record in the installed attributes table 534. Table 8, below, shows the installed attributes table 534 in more detail.

TABLE 8

Installed Attributes

| Attribute Name | Attribute Description | Type |
| --- | --- | --- |
| INSTALLEDATTRIBUTE_ID | Unique Identifier of the Installed Attribute | Integer |
| ATTRIBUTE_ID | Identifier of the Attribute | Integer |
| ATTRIBUTE_VALUE | Name of the Attribute | Integer |
| INSTALLEDSERVICE_ID | Identifier of the Installed Service | |
| STATUS_ID | Identifier of Installed Attribute status (e.g., activated, deactivated) | Integer |
| CREATIONDATE | Creation Date | Date |
| LASTMODIFIEDDATE | Last Modified Date | Date |

A service attribute table 538 stores the name, description, and a default value for attributes of exposed services available through the third party access gateway 110. Examples of service attributes include:

Recurring charge: the cost to be paid every month to use the service (e.g., the monthly cost for access to the Send SMS or Send MMS exposed services).

Threshold: the amount of SMS or MMS messages which may be sent every month.

Extra quota: the cost per SMS or MMS message when the threshold has been exceeded.

The default value may be exported into the installed attribute table. The value in the installed attribute table may then be modified appropriately for a specific company application.

An attribute identifier field 540 serves as a primary key to uniquely identify each record in the service attribute table 538. Table 9, below, shows the service attribute table 534 in more detail.

TABLE 9

Service Attribute

| Attribute Name | Attribute Description | Type |
| --- | --- | --- |
| ATTRIBUTE_ID | Unique Identifier of the Attribute | Integer |
| SERVICE_ID | Identifier of the Service | String |
| ATTRIBUTE_NAME | The name of the attribute | String |
| ATTRIBUTE_DEFAULT_VALUE | The attribute default value | String |
| ATTRIBUTE_DESCRIPTION | The description of the attribute | String |
| STATUS_ID | Identifier of Service Attribute status (e.g., activated, deactivated) | Integer |
| CREATIONDATE | Creation Date | Date |
| LASTMODIFIEDDATE | Last Modified Date | Date |

A service catalog table 542 stores the name, description, status and other information associated with the exposed services available through the third party access gateway 110. Each business application 114 or service provider 106 may subscribe to one or more services defined in the service catalog table 542. The service catalog table 542 may establish records which provide a name, description, identifier, and status for exposed SMS, MMS, Charge, or other types of exposed services. A service identifier field 544 serves as a primary key to uniquely identify each record in the service catalog table 542. Table 10, below, shows the service catalog table 542.

TABLE 10

Service Catalog

| Attribute Name | Attribute Description | Type |
| --- | --- | --- |
| SERVICE_ID | Unique Identifier of the Service | Integer |
| SERVICE_NAME | The name of the Service | String |
| SERVICE_DESCRIPTION | The description of the Service | String |
| STATUS_ID | Identifier of Service Catalog status (e.g., activated, deactivated) | Integer |
| CREATIONDATE | Creation Date | Date |
| LASTMODIFIEDDATE | Last Modified Date | Date |

As an example, the profiling database 228 may define an exposed SMS service. To that end, the service catalog may establish a new record with a Service_Name set to "Send SMS". The service attribute table may then set an Attribute_Name of "Threshold", with an Attribute_Default_Value of "100" (i.e., 100 SMS messages per month). The Attribute_Description optionally may be set to a text string which describes the Threshold. The Service Attribute table may also define a Recurring Charge attribute with an Attribute_Default_Value of $1,000 (i.e., access to the exposed service costs $1,000 per month). An associated Attribute_Description may provide a text string which describes the recurring charge.

A third party company may negotiate with the telecommunications service provider to have access to the exposed SMS message service. The terms and conditions of the access will depending on the negotiation and are supported by the data model in the profiling database 228. The profiling database 228 will establish a company record for the company, and establish a company application record linked to the company. The installed services table may then establish an installed service record for the company application which specifies the "Send SMS" service defined in the service catalog. The default values provided in the service attribute table may be set specifically for the company in the installed attributes table. For example, the installed attributes table may define a Threshold of 10,000 SMS messages per month, and a Recurring Charge of $5,000 per month.

A combination of a company application and installed services establishes a client portfolio for the company application. The company application submits service requests which the third party gateway 110 authorizes with reference to the client portfolio. The data model established in the portfolio database 228 supports flexible definition, modification, and deletion of the client portfolios.

FIG. 5 shows that the profiling database 228 implements a data model which supports particularly efficient establishment and authorization of different types of service requests. The company table 502 acts as a root table which relates multiple types of service requesters back to an associated company. From the company table 502, the data model establishes independent branches for network communication requesters and exposed service requesters. Each type of requester is associated with a company. As examples, one company may include both employees who request network communication service (e.g., Internet browsing service) and at the same time the company may establish applications (e.g., a SMS front end) which submit requests for an exposed SMS service.

The data model allows the third party gateway 110 to authorize each type of requester based on different criteria. The criteria may therefore be independently chosen and tailored to the requester types. At the same time, the branching structure of the data model allows each type of requester to coexist in the same data model, establish a relationship to a single company, and support unique authorization controls for each type of requester.

The company table defines one or more companies which may access the third party gateway 110 using unique company identifiers in the company table 502 (Table 2). The end user branch 554 is established by providing unique end user identifiers 508 in the end user table 506 and a relation back to a specific company using the company identifier field. Similarly, the company application branch 556 is established by providing unique application identifiers 528 which establish company applications with a relation back to a specific company using the company identifier field. Thus, the end users and requesting applications are linked back to a company which may include both types of requesters.

Furthermore, each branch in the data model provides a mechanism for establishing different authorization criteria for each type of requester. In the end user branch, for example, the MSISDN provides a data field on which to authorize network communication access requests (e.g., for a mobile telephone user or PDA user who is browsing the internet). Accordingly, the end user branch establishes an MSISDN table 510 which associates end users to MSISDNs through the MSISDN identifier field in the end user table 506 (Table 2).

The data model also provides multiple authorization options for the end users. To that end, the data model establishes the status table 520 which defines statuses (e.g., Active, Deactivated, Suspended, or Idle). The third party gateway 110 may determine from the status whether a request should be authorized. Each end user defined in the end user table 506 and each MSISDN defined in the MSISDN table 510 may specify a status.

For example, the service request handler 224 may manage authorization policies by considering an end user's network communication request to be authorized when the service request is accompanied by an MSISDN established in the MSISDN table 510. Depending on the policy, the service request handler 224 may also check to ensure that the MSISDN has an authorized status (e.g., Active). Additionally or alternatively, depending on the policy, the service request handler 224 may check to ensure that the end user linked to the MSISDN has an authorized status. The data model thereby provides an efficient and flexible mechanism for establishing authorization control of the end users. Furthermore, the authorization control for the end users is independent of the authorization control of the company applications.

The application branch in the data model establishes a different authorization mechanism for the company applications. In particular, the application branch establishes authorization based on certificate identifiers. To that end, each company application defined in the application table 524 includes a certificate identifier field 526. The certificate identifier field 526 stores a pre-assigned identifier (e.g., a public key) which may be checked against an identifier obtained from a digital certificate (e.g., a public key or a subject unique identifier) through authentication of the digital certificate.

The certificate identifier is obtained during authentication. Including a certificate identifier in the company application record in the database 228 efficiently extends use of the certificate identifier to authorization, without requiring additional authorization identifiers. Thus, the capability handler 228 not only supports a very secure authentication technique, but also uses results obtained from authentication for efficient and secure authorization of the company applications. The enhanced authorization of company applications provides a strong protection against unauthorized access of valuable telecommunications services by third parties.

Furthermore, the data model provides a flexible service definition and attribute definition structure. In particular, the data model may associate one or more installed services to each company application using the application identifiers in the installed services table 530 (Table 7). In this manner, the exposed services which the company application is authorized to request are established and linked to the company application. The service catalog table 542 may then provide a detailed description for each installed service using the service description field.

Similarly, the installed attributes table 534 may define specific attributes of an installed service through the link provided by the installed service identifier field (Table 8). The service attribute table 538 may then provide a detailed description for each attribute using the attribute description field. Default values for installed attributes may be provided from the service attribute table 538.

Each of the tables 524, 530, 534, 538, and 542 in the company application branch may include a status identifier field. The data model thereby provides a great deal of additional policy management flexibility in establishing when a company application is authorized to use any given exposed service. For example, after authentication and recovery of the certificate identifier, the capability handler 228 may establish an authorization policy which determines that a company application is authorized to use a requested service when an Active company application matching the certificate identifier is found in the company application table 524. Additionally, the policy may require that company application is linked to an Active installed service which matches the requested exposed service. Further, depending on the authorization policy, the capability handler 228 may require that the installed service is linked to an Active installed attribute, service attribute, or service catalog entry. Depending on the policy enforced, the data model may flexibly permit or deny access to an exposed service by modifying the status fields in one or more of the tables 524, 530, 534, 538, and 542.

Thus, the data model supports flexible policy management based on status fields and authorization identifiers (e.g., MSISDN identifiers and certificate identifiers) to examine when authorizing end users, company applications, or other service requesters. The policies may specify status criteria for one or more records in the data model at one or more levels (e.g., the company level, the end-user level, the MSISDN level, or the company application level) within each branch in the data model before a request is considered authorized. The policies may vary for each company application and end-user.

As noted above, the reporting module 234 may parse the log files 236 and responsively populate log tables in the profiling database 228. A first log table 546 may store information logged (e.g., on a daily basis) for communication network access request (e.g., HTTP requests). An object identifier field 538 provides a unique identifier of each row in the log table 546. Table 11 shows an example implementation of the first log table 546.

TABLE 11

Log Table

| Attribute Name | Attribute Description | Type |
|---|---|---|
| OBJECT_ID | Unique Identifier of the Table row | Integer |
| DATETIME | The date of the event | String |
| MSISDN | The MSISDN | String |

TABLE 11-continued

Log Table

| Attribute Name | Attribute Description | Type |
| --- | --- | --- |
| SERVICE_PARTY_ID | The Service Party ID | String |
| TRANSACTION_ID | The event transaction ID | String |
| MODULE_IDENTIFIER | The third party access gateway module identifier | String |
| ACTION | The point where the log has been taken | String |
| ELAPSED_TIME | The time elapsed in each action | Integer |
| APPLICATION_NAME | The name of the Application | String |
| COMPANY_NAME | The name of the Company | String |
| APPLICATION_URL | The home application URL | String |
| REQUESTED_URL | The requested URL | String |
| ERROR_CODE | The error code | String |

A second log table 550 may store information logged (e.g., on a daily basis) for exposed service requests (e.g., SMS charge requests). An object identifier field 552 provides a unique identifier of each row in the log table 550. Table 12 shows an example implementation of the second log table 546.

TABLE 12

Company

| Attribute Name | Attribute Description | Type |
| --- | --- | --- |
| OBJECT_ID | Unique Identifier of the Table row | Integer |
| DATETIME | The date of the event | String |
| TRANSACTION_ID | The event transaction ID | String |
| MODULE_IDENTIFIER | The third party access gateway module identifier | String |
| APPLICATION_NAME | The name of the Application | String |
| COMPANY_NAME | The name of the Company | String |
| BRICK_NAME | The Name of a wrapper applied to the request | String |
| ACTION | The point where the log has been taken | String |
| MSISDN_QUANTITY | The quantity of MSISDN sent | String |
| ERROR_CODE | The error code | String |
| TRANSACTION_RESULT | The transaction result | String |
| MESSAGE_VOLUME_KB | The amount of data transferred | Integer |
| ARTICLE_ID | The article ID for payment transactions | String |
| ASSET_CREATION_DATE | The creation date of the asset requested | Date |
| ARTICLE_PRICE | The article price | String |
| CURRENCY | The article currency | String |
| ARTICLE_PRICE_BAND | The article price band | String |
| INVOICE_TEXT | The invoice text | String |
| ASSET_QUANTITY | The number of assets requested | Integer |

Figure 6:
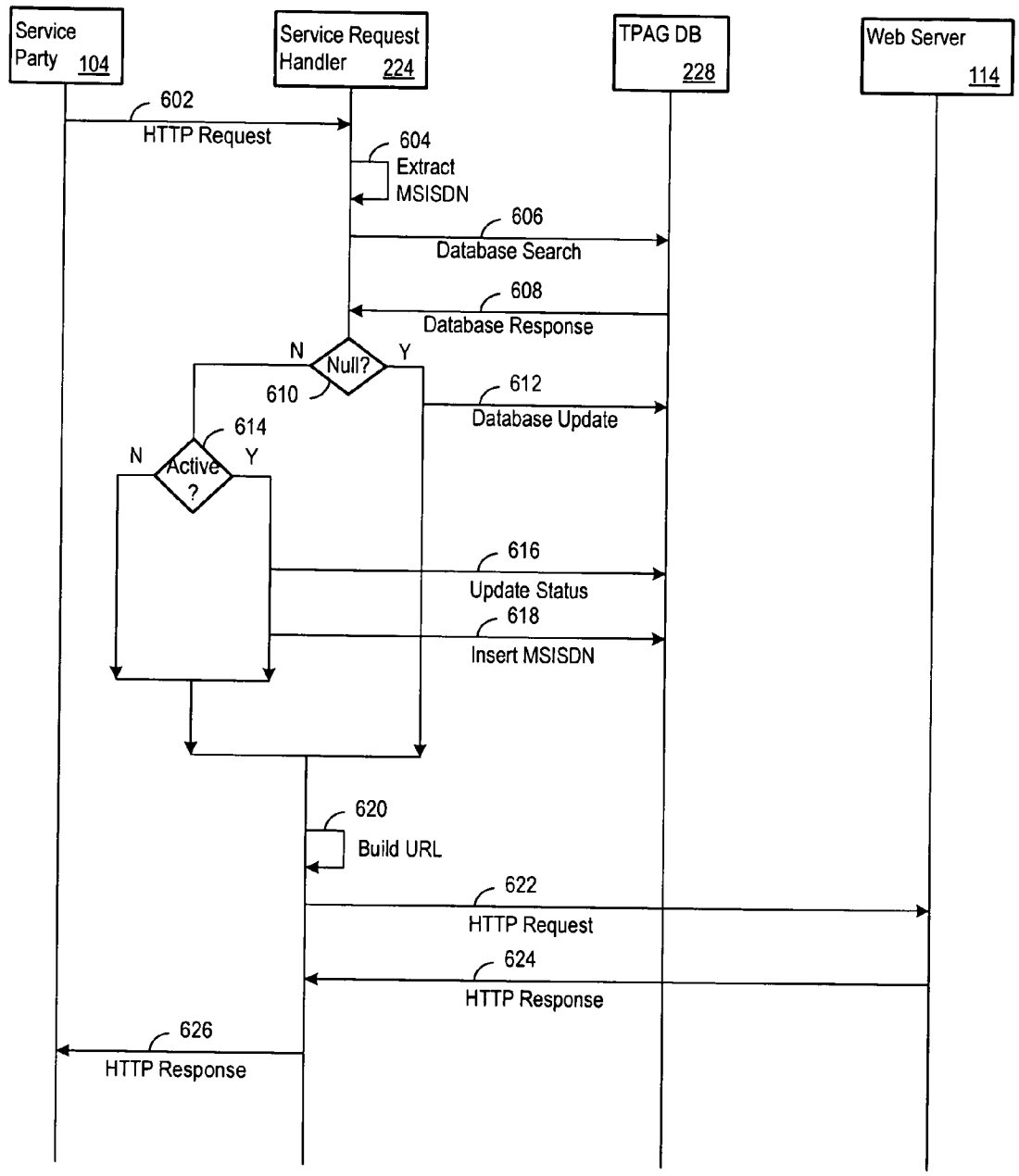
FIG. 6 shows a message flow diagram for a communication network access request.

FIG. 6 shows a message flow diagram 600 for handling a communication network access request. As an overview, the service request handler 224 receives the access request, authorizes the requester, and forwards the request to a web server. The web server returns the access request results to the service request handler 224, which in turn returns the results to the requesting party.

FIG. 6 shows that a service party (e.g., an end user or subscriber device) sends an HTTP service request (Act 602), which may include an MSISDN, a service party identifier, a URL, or other network access information. The service request handler 224 extracts the MSISDN from the HTTP request (Act 604). The service request handler 224 initiates a database search based on the MSISDN. If the MSISDN is found and is Active, then the request is authorized.

The service request handler 224 may also search the profiling database 228 to determine whether a record of the service party exists (Act 606). The profiling database 228 returns the search results (Act 608). If the service party does not currently exist (Act 610), the service request handler 224 adds the service party to the profiling database 228 and associates the service party with the active MSISDN (Act 612).

The service request handler 224 may also determine that the service party does exist, and that the extracted MSISDN is a new MSISDN for the service party (Act 614). In that case, the service request handler 224 may update the status of the old MSISDN for the service party to Inactive (Act 616). In addition, the service request handler 224 updates the MSISDN for the service party in the profiling database 228 (Act 618) to reflect the new MSISDN. The service request handler 224 thereby accurately maintains which service parties are associated with which MSISDNs.

Furthermore, the service request handler 224 sends the request to a web server which responds with the requested data. To that end, the service request handler 224 may route the request to a web server based on the MSISDN. For example, the service request handler 224 may implement a lookup table which establishes a correspondence between the MSISDNs and the web servers assigned to handle their requests.

To that end, in one implementation the service request handler 224 builds a new URL (Act 620) based on the URL in the request and the assigned web server. In other words, the new URL specifies a request for the content in the original URL, from the server mapped to the MSISDN. The service request handler 224 forwards the HTTP request to the selected web server (Act 622) and receives the responsive data (Act 624). The responsive data is communicated to the originating service party (Act 626).

Figure 7:
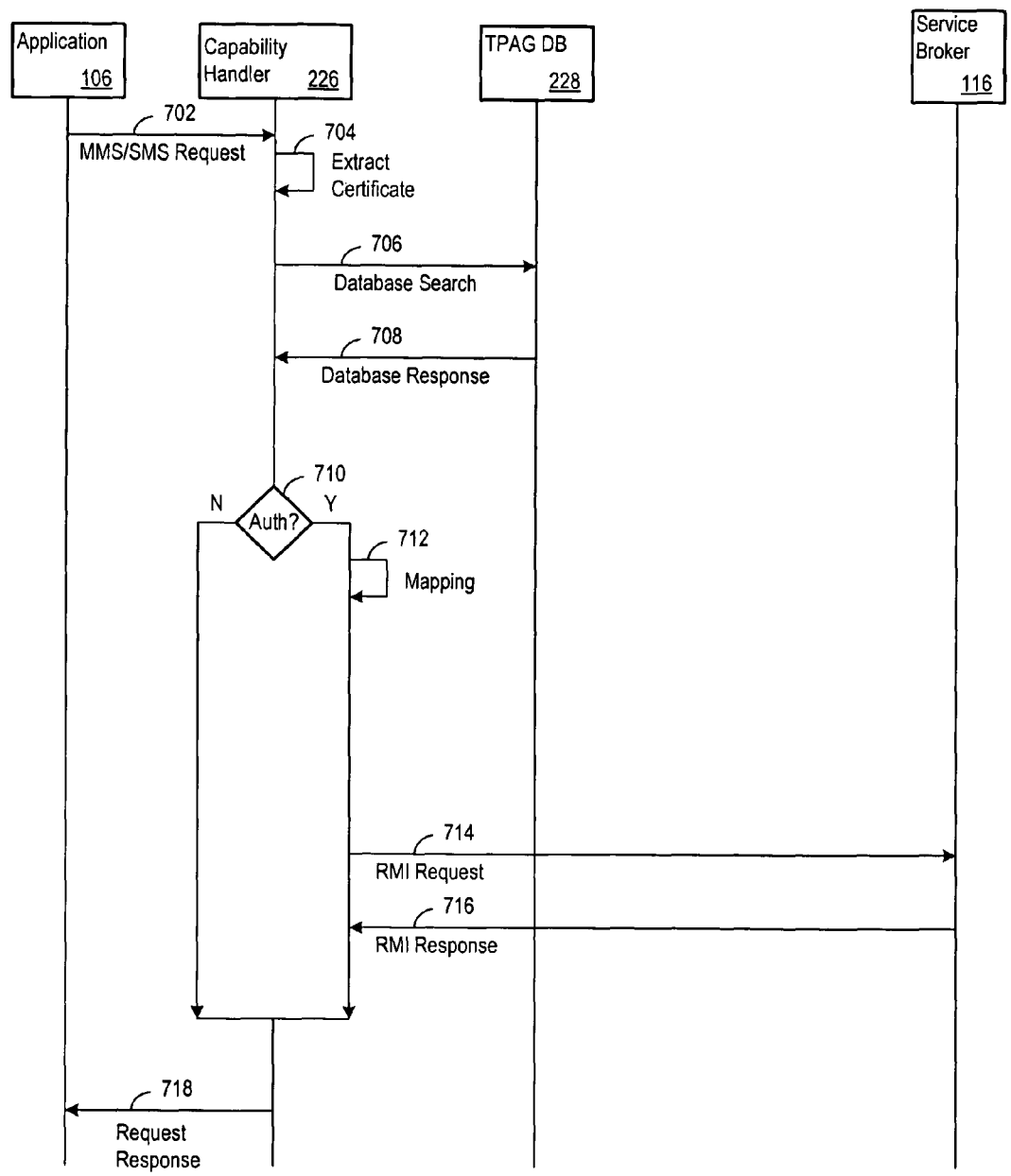
FIG. 7 shows a message flow diagram for SMS and MMS exposed service requests.
Figure 8:
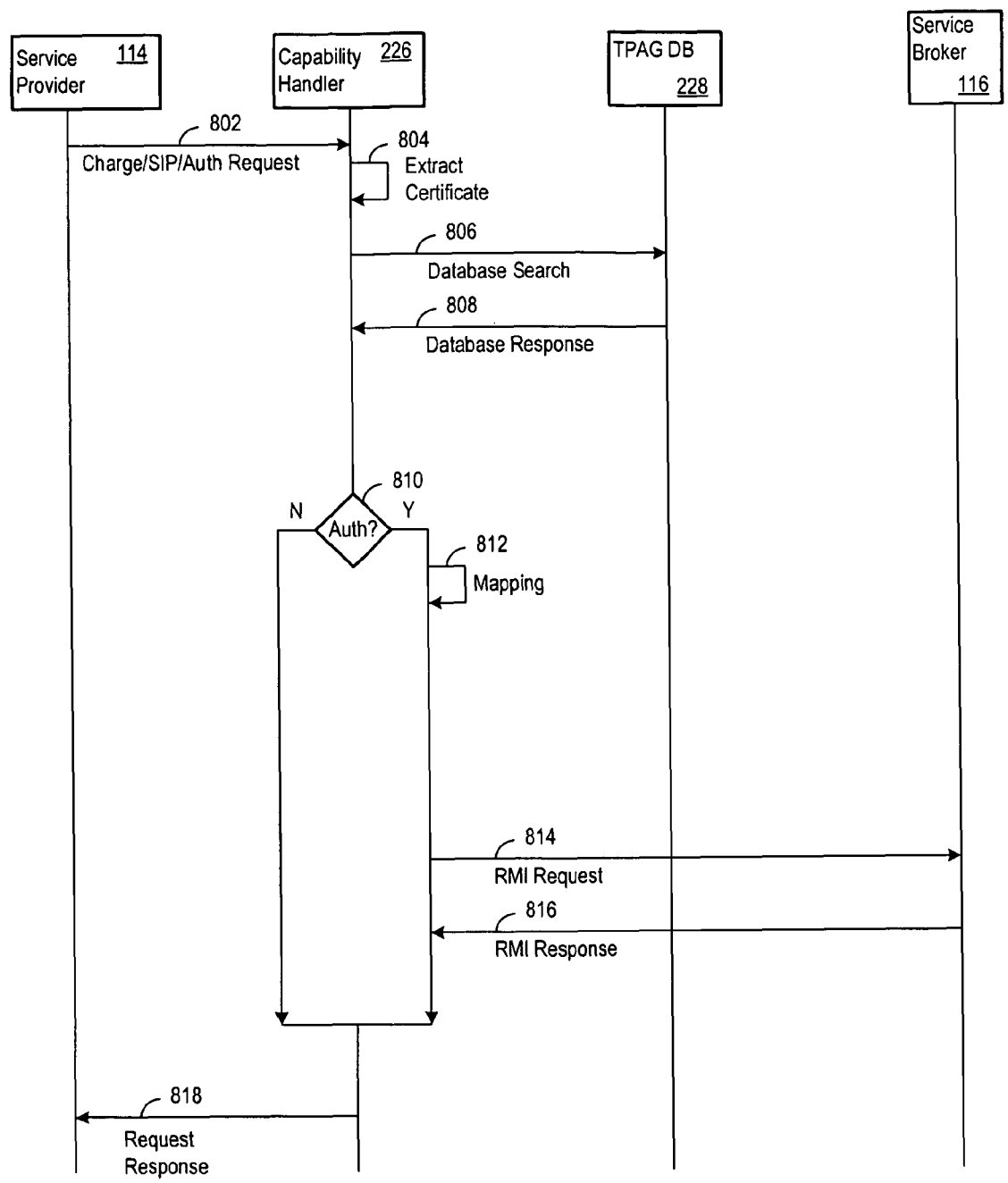
FIG. 8 shows a message flow diagram for Charge, SIP, and Authorization service requests.

FIGS. 7 and 8 shows message flow diagrams 700 and 800 for handling an exposed service request. As an overview, the capability handler 226 receives the service request, authenticates the requester and verifies that the requester is authorized to access the exposed service. Exposed service requests from authenticated and authorized requesters are wrapped and delivered to the service broker 116.

As shown in FIG. 7, the capability handler 226 receives an MMS/SMS service request (Act 702) from an external company application 106. Service requests may also be received from service providers 114. The capability handler 226 extracts a certificate identifier (Act 704) from the request. The capability handler 226 searches the profiling database 228 for a matching certificate identifier (Act 706) in the company application table 524, and the profiling database 228 returns the search results (Act 708). A matching certificate identifier may authorize the requesting company application or may be one check made to authorize the company application (Act 710). Additional checks may be performed before authorization is complete, such as checking the status of the company application and/or the associated company.

The capability handler 226 applies a mapping to the service request (Act 712). The capability handler 226 then sends the RMI request to the service broker 116 (Act 714). The service broker 116 returns a request response to the RMI request (Act 716). The response may be an acknowledgement that the service broker 116 has received the request. The capability handler 226 returns the request response to the application 106 (Act 718).

As shown in FIG. 8, the capability handler 226 receives a Charge, SIP, or User Authorization request (Act 802) from a service provider 114 and extracts a certificate identifier (Act 804). A company application may also submit such service requests. The capability handler 226 searches the profiling database 228 for a matching certificate identifier (Act 806) in the application table 524, and the profiling database 228 returns the search results (Act 808). The capability handler 226 determines whether the authenticated application is authorized (Act 810).

More specifically, a matching certificate identifier may authorize the application or provide a first step in authorizing the company application. The capability handler 226 may also search the profiling database 228 for the services associated with the requesting company application. If an active service is found associated with the requesting application in the profiling database 228, the capability handler 226 may authorize the service request. The capability handler 226 may implement other authorization policies based on the status of the requesting company application, associated company, or other records in the profiling database 228.

For authenticated applications which submit authorized service requests, the capability handler 226 wraps the service request for submission. The capability handler 226 may then perform a remote method invocation to issue the request to the service broker 116. The capability handler 226 thereby sends via RMI a wrapped request to the service broker 116 (Act 814). The capability handler 226 receives a response from the service broker 116 (Act 816). The response may be an acknowledgement, error message, or other response provided by the service broker 116. The capability handler returns the request response to the application 106 (Act 818).

FIG. 9 shows an example of a service request 900 for an exposed SMS service. An application may submit the SMS service request to the architecture 100 to request that the architecture 100 send an SMS message and charge for the SMS message on behalf of the application. The service request 900 includes a transaction identifier field 902, which may provide a unique identifier of the service request; a message type field 904, which may specify that the request is an SMS request, and an SMS version field 906, which specifies which version of SMS the request adheres to. The service request 900 also includes addressing information such as a To Address field 910, a CC Address field 912, and a BCC address field 914. A service code field 916 provides an identifier of the service provider submitting the SMS service request.

Delivery timing information is also present in the service request 900. In particular, the request 900 includes a time of request field 918, a time of expiry field 920, and an earliest delivery time field 922. The request 900 also specifies the message priority using the priority field 924, the subject of the message in the subject field 926, the party to charge for delivery of the message in the charged party field 928. The content of the SMS message is present in the content field 930.

As noted above, the exposed service interface 412 may wrap the request to a standard form for the service broker 116. FIG. 10 shows an example of a wrapped SMS message 1000. The SMS wrapper 414 maps the transaction identifier field 902 to the transaction identifier field 1002, adds a transaction label field 1004 which may specify the message type (e.g., "SMSDELIVERY" for SMS messages); and maps the message type field 904 to the service type field 1006, while dropping the SMS version field 906. Similarly, the SMS wrapper 414 maps the addressing fields 910-914 to the To Address field 1010, CC Address field 1012, and BCC address field 1014, and also maps the service code field 916 to the service identifier field 1016.

Delivery timing information is also present in the wrapped request 1000. In particular, the SMS wrapper 414 maps the time of request field 918 to a start date field 1018, maps the time of expiry field 920 to the end date field 1020, and drops the earliest delivery time field 922. The SMS wrapper 414 also maps the priority field 924 to the priority field 1022, the subject field 926 to the subject field 1024, and the charged party field 928 to the account identifier field 1026. The content of the SMS message is mapped from the content field 930 to the message body field 1028.

Table 13 shows an example implementation of a wrapped XML SMS request message with field values derived from the request message shown in FIG. 9. The wrapped message adds a label field (set to "SMSDELIVERY" for SMS messages).

TABLE 13

```
<?xml version="1.0" encoding="ISO-8859-1" ?>
    <TSOheader TSOID="12345" TSOlabel="SMSDELIVERY" />
    <TSOattributes>
        <attribute name="SERVICE_TYPE" value="SMS" />
        <attribute name="SENDERADDRESS" value="M-Site" />
        <attribute name="SERVICEID" value="55555" />
        <attribute name="STARTDATE" value="05/05/2004" />
        <attribute name="ENDDATE" value="10/05/2004" />
        <attribute name="PRIORITY" value="High" />
        <attribute name="SUBJECT" value="Message" />
        <attribute name="ACCOUNTID" value="77777" />
        <attribute name="MESSAGE_BODY"
        value="This is the SMS message." />
        <attribute name="CHARGE_FLAG" value="1" />
        <list name="TO_ADDRESSEE" value="3">
            <attribute name="1" value="+39xxxx" />
            <attribute name="2" value="+39xxxx" />
            <attribute name="3" value="+39xxxx" />
        </list>
        <list name="CC_ADDRESSEE" value="4">
            <attribute name="1" value="+39xxxx" />
            <attribute name="2" value="+39xxxx" />
            <attribute name="3" value="+39xxxx" />
            <attribute name="4" value="+39xxxx" />
        </list>
        <list name="BCC_ADDRESSEE" value="3">
            <attribute name="1" value="+39xxxx" />
            <attribute name="2" value="+39xxxx" />
            <attribute name="3" value="+39xxxx" />
        </list>
    </TSOattributes>
</TSO_DATA>
```

FIG. 11 shows an example of an exposed service response 1100 returned from the service broker 116. The response 1100 provides an acknowledgement of the request, and includes a transaction identifier field 1102, a transaction label field 1104, and a request status field 1106. The response 1100 also provides an error code field 1108 and an error description field 1110 which convey error conditions to the requesting application.

Table 14 shows an example of an XML message which conveys the data fields shown in FIG. 11.

TABLE 14

```
<?xml version="1.0" encoding="ISO-8859-1" ?>
    <TSOheader TSOID="12345" TSOlabel="SMSDELIVERY" />
    <TSOresult>
        <statusCode>0</statusCode>
        <errorCode></errorCode>
        <errorDescription></errorDescription>
    </TSOresult>
</TSO_DATA>
```

The capability handler 226 may also wrap the service broker response for delivery to the requesting application. In other words, the form and content of the response message returned to the requesting application may differ from the form and content of the response message sent from the service broker 116. FIG. 12 shows an example of a wrapped SMS response 1200.

The SMS wrapper 414 maps information from the response 1100 to the wrapped response 1200, including a transaction identifier field 1202, status field 1204, error code field 1206, and error description field 1208. The wrapped response 1200 also adds a message type field 1210 (e.g., set to "<SMS>" or another value expected by the requesting application), and an SMS version field 1221 which reports the applicable SMS version to the requesting application. The transaction label field 1104 may be dropped.

Figure 13:
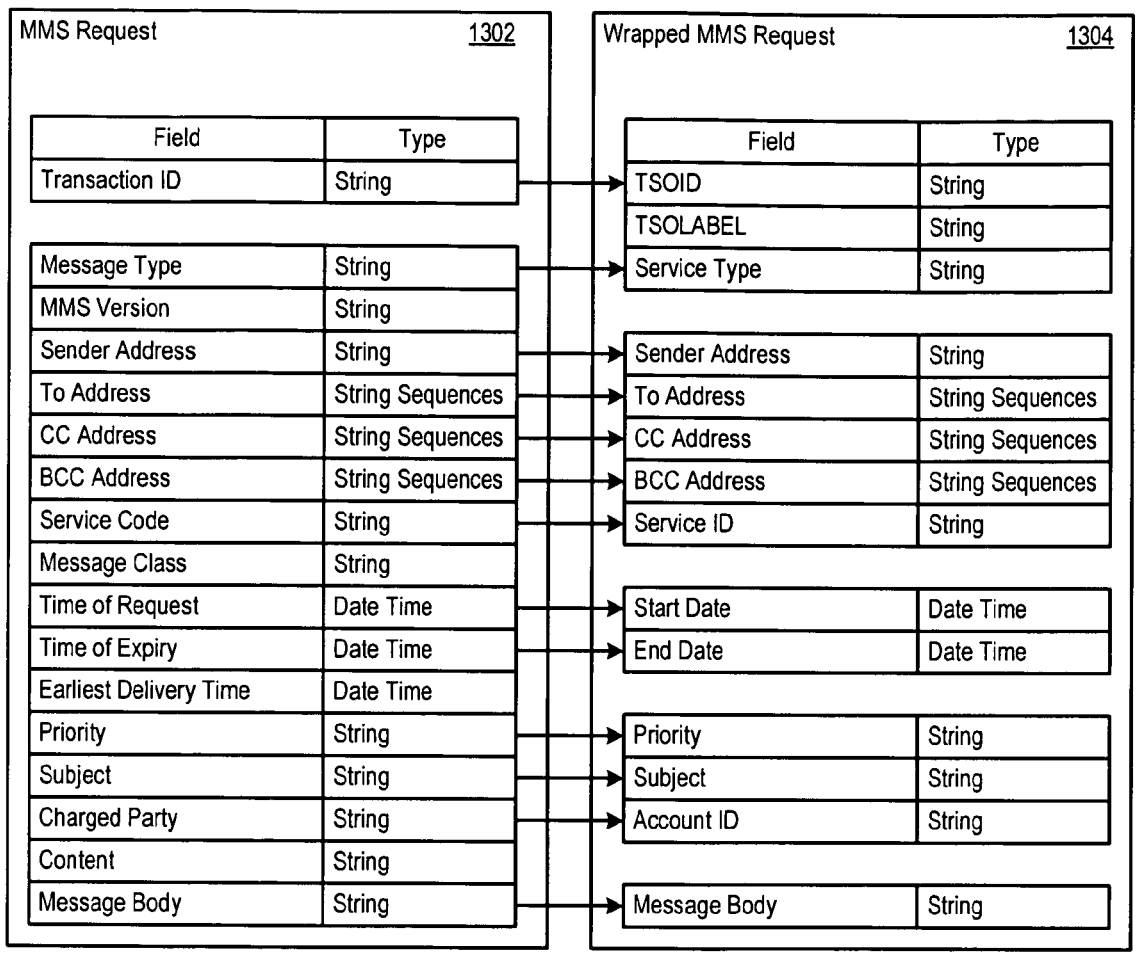
FIG. 13 shows a mapping from an MMS exposed service request to a wrapped MMS service request.
Figure 14:
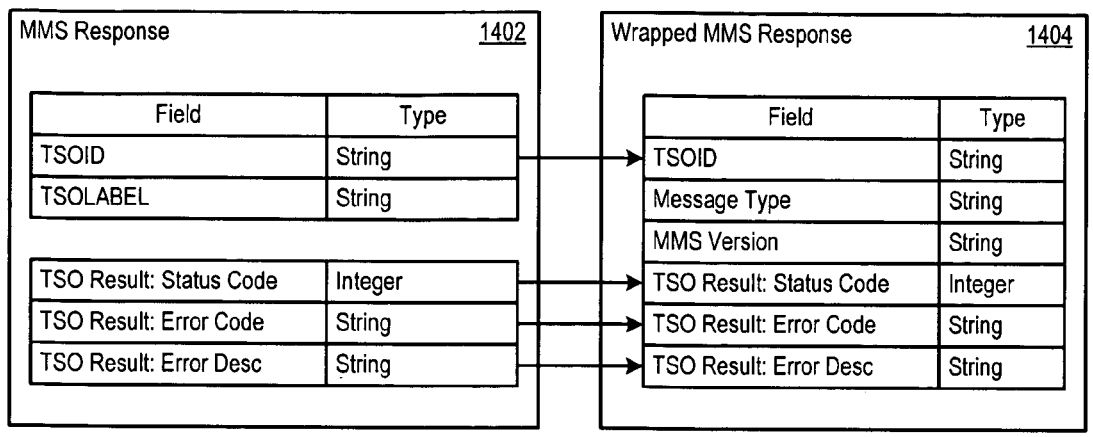
FIG. 14 shows a mapping from an MMS exposed service response to a wrapped MMS service response.

FIG. 13 shows a mapping from an MMS exposed service request 1302 to a wrapped MMS service request 1304. The TSOLABEL may be set to "MMSDelivery" or any other identifier. An application may issue the MMS service request to deliver multimedia content to any specified recipient. FIG. 14 shows a mapping from an MMS exposed service response 1402 to a wrapped MMS service response 1404.

Figure 15:
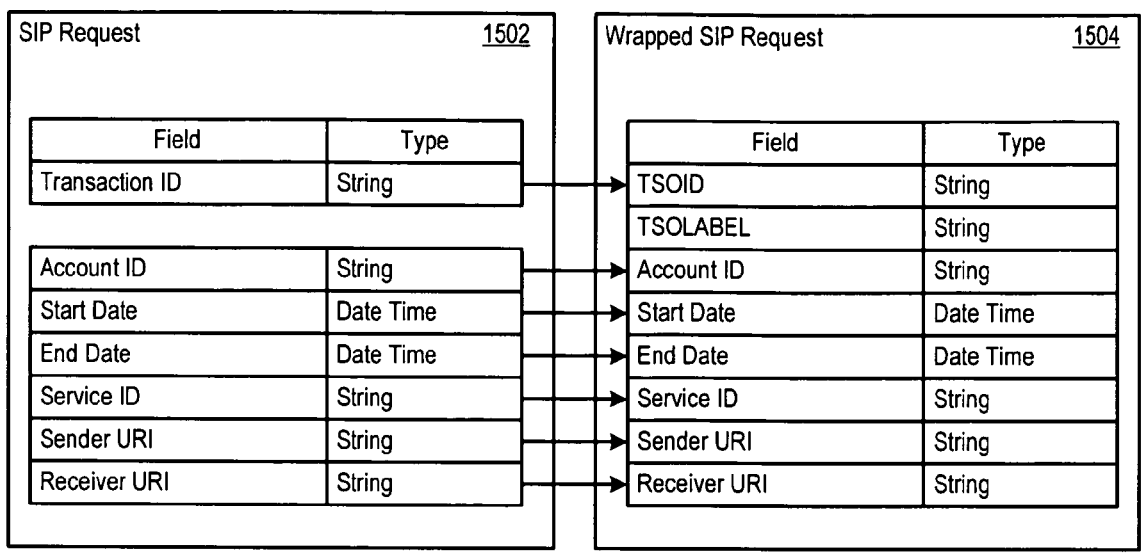
FIG. 15 shows a mapping from an SIP exposed service request to a wrapped SIP service request.
Figure 16:
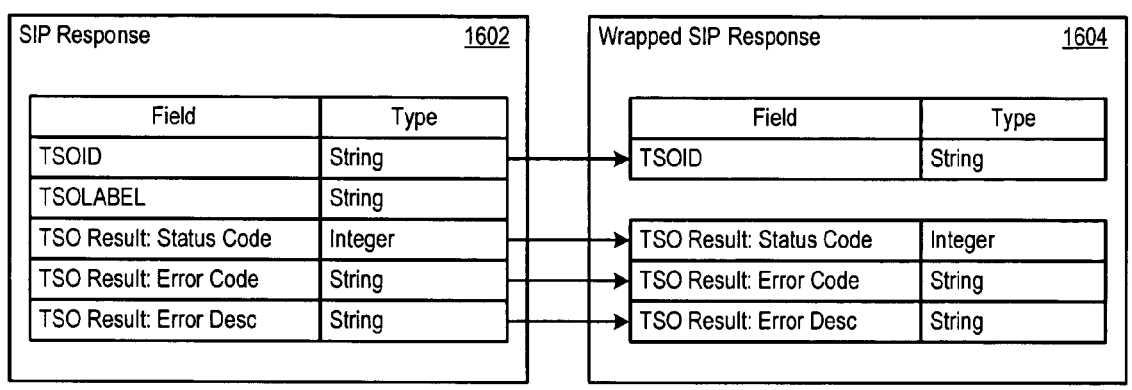
FIG. 16 shows a mapping from a SIP exposed service response to a wrapped SIP service response.

FIG. 15 shows a mapping from an SIP exposed service request 1502 to a wrapped SIP service request 1504. The TSOLABEL may be set to "SIPCall" or any other identifier. A requesting application may initiate a SIP request to establish a communication channel between a sender and a receiver specified in the SIP request 1502. FIG. 16 shows a mapping from a SIP exposed service response 1602 to a wrapped SIP service response 1604. The TSOLABEL field may be dropped.

Figure 17:
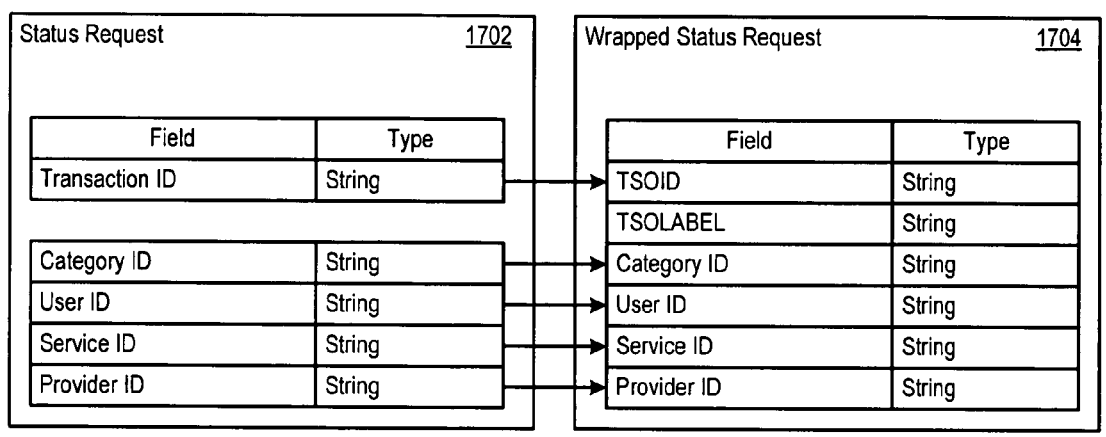
FIG. 17 shows a mapping from a Status exposed service request to a wrapped Status service request.
Figure 18:
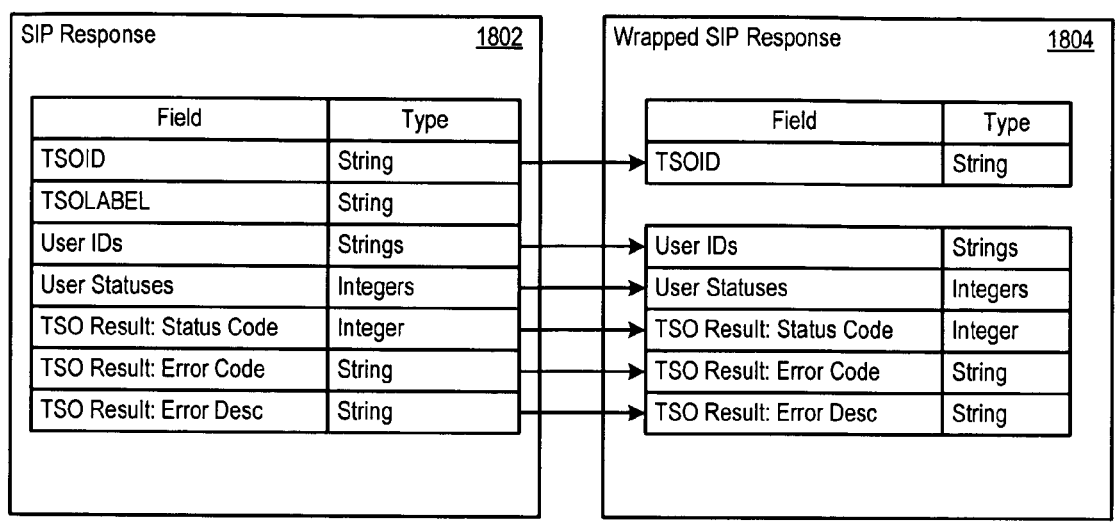
FIG. 18 shows a mapping from a Status response to a wrapped Status service response.

FIG. 17 shows a mapping from a Status exposed service request 1702 to a wrapped Status service request 1704. The TSOLABEL may be set to "GetUserStatus" or any other identifier. A requesting application may issue the Status request to check the status of one or more users listed in the status request 1702. The Status request 1702 may further include provider identifiers to request status with respect to specific service providers. FIG. 18 shows a mapping from a Status response 1802 to a wrapped Status service response 1804.

Figure 19:
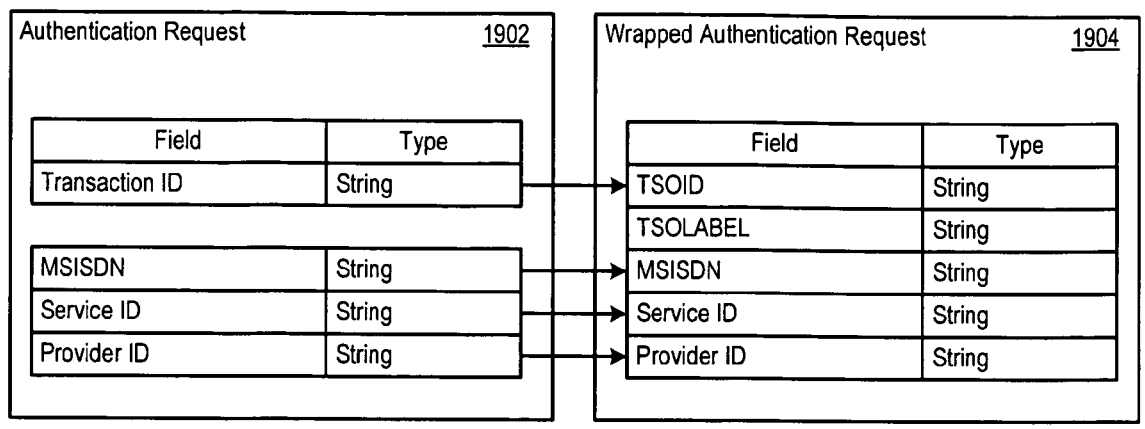
FIG. 19 shows a mapping from an Authentication exposed service request to a wrapped Authentication service request.
Figure 20:
FIG. 20 shows a mapping from an Authentication exposed service response to a wrapped Authentication service response.

FIG. 19 shows a mapping from an Authentication exposed service request 1902 to a wrapped Authentication service request 1904. The TSOLABEL may be set to "Authentication" or any other identifier. A requesting application may issue the authentication request 1902 in order to ask for authentication of an MSISDN with respect to a particular service and provider. FIG. 20 shows a mapping from a Status exposed service response 2002 to a wrapped Status service response 2004. The response may include a wide range of status information, such as service status (e.g., "ok", or "disconnected"), customer type (e.g., "commercial" or "residential"), identification information for the customer's service plan, SIM module, wireless device type, capability to send or receive MMS, UMTS, or GPRS messages, the access channel (e.g., "mobile" or "landline"), or any other status information available for the MSISDN.

Figure 21:
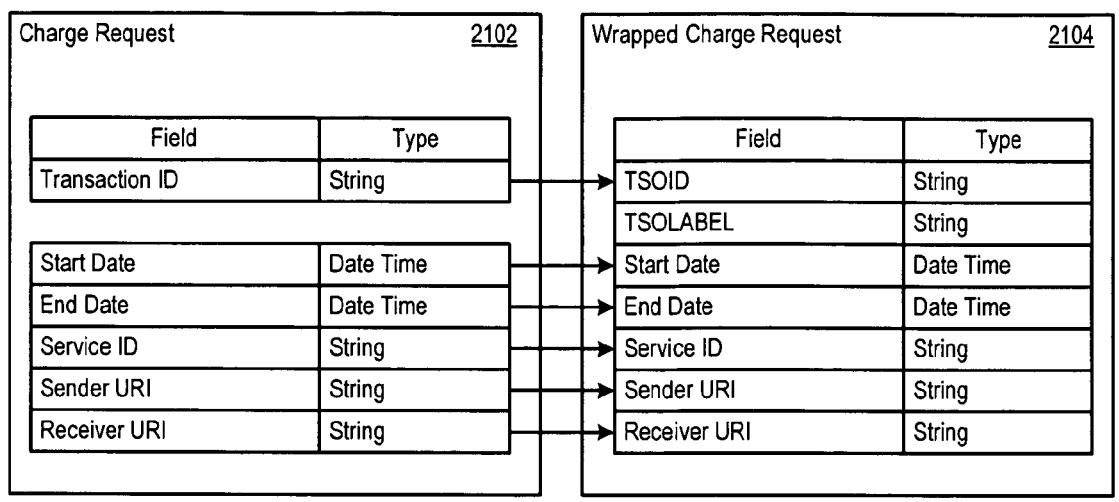
FIG. 21 shows a mapping from a Charge exposed service request to a wrapped Authentication service request.
Figure 22:
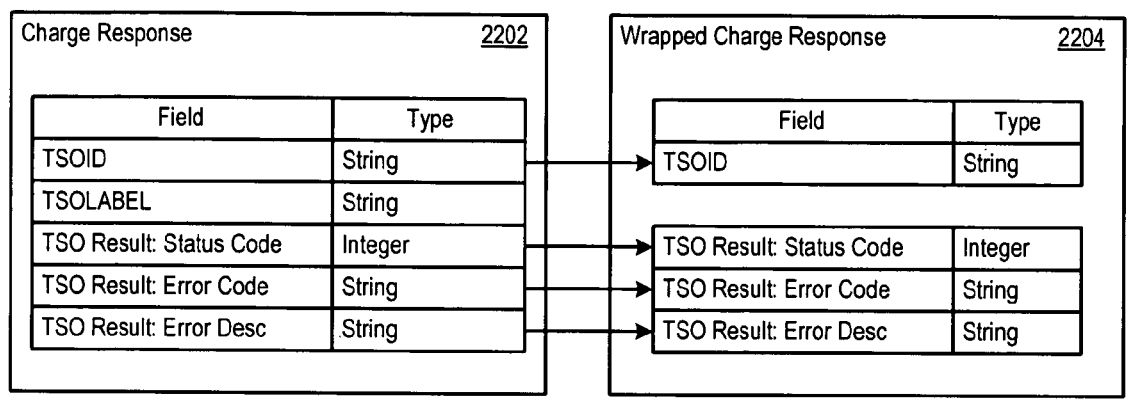
FIG. 22 shows a mapping from a Charge exposed service response to a wrapped Authentication service response.

FIG. 21 shows a mapping from a Charge exposed service request 2102 to a wrapped Charge service request 2104. The TSOLABEL may be set to "Charge" or any other identifier. A requesting application may initiate a charge request to request billing for a communication session with the specified begin and end date between two endpoints (e.g., between a sender URI and a receiver URI) and handled by the a service provider specified in the Charge request 2102. FIG. 22 shows a mapping from a Charge exposed service response 2202 to a wrapped Charge service response 2204. The TSOLABEL field may be dropped in the response.

Table 15 shows an example of a WSDL definition for an exposed service. In particular, Table 15 shows an example WSDL Charge service descriptor which may define input and output messages and the message format for an exposed service. The Charge service descriptor defines a <port> ("ChargeAdapterFrontEnd") through which the Charge service requests and responses are sent as defined by the input and output messages. Furthermore, the Charge service descriptor defines the message form and content for the input and output messages ("submitReqRequest", and "submitReqResponse", respectively). A SOAP binding is also defined, as is the location to which the Charge exposed service requests are sent (via the "location" specifier).

WSDL definitions may be established for each exposed service in a similar manner. The WSDL definitions may vary widely depending on the implementation of the gateway 110 and the exposed services.

TABLE 15

```
<?xml version="1.0" encoding="UTF-8"?>
<wsdl:definitions targetNamespace="http://[address]"
xmlns="http://schemas.xmlsoap.org/wsdl/"
xmlns:apachesoap="http://xml.apache.org/xml-soap" xmlns:impl="http://[address]"
xmlns:intf="http://[address]"
xmlns:soapenc="http://schemas.xmlsoap.org/soap/encoding/"
xmlns:tns2="http://[address]" xmlns:tns3="http://[address]"
xmlns:wsdl="http://schemas.xmlsoap.org/wsdl/"
xmlns:wsdlsoap="http://schemas.xmlsoap.org/wsdl/soap/"
xmlns:xsd="http://www.w3.org/2001/XMLSchema">
    <wsdl:types>
        <schema targetNamespace="http://[address]"
xmlns="http://www.w3.org/2001/XMLSchema">
            <import namespace="http://schemas.xmlsoap.org/soap/encoding/"/>
            <complexType name="WrappedRequest">
                <sequence>
                    <element name="certId" nillable="true" type="xsd:int"/>
                    <element name="transactionId" nillable="true" type="xsd:string"/>
                </sequence>
            </complexType>
            <complexType name="Status">
                <sequence>
                    <element name="details" nillable="true" type="xsd:string"/>
                    <element name="statusCode" type="xsd:int"/>
                    <element name="statusText" nillable="true" type="xsd:string"/>
                </sequence>
            </complexType>
            <complexType name="WrappedResponse">
                <sequence>
                    <element name="status" nillable="true" type="tns3:Status"/>
```

TABLE 15-continued

```
            <element name="transactionId" nillable="true" type="xsd:string"/>
         </sequence>
      </complexType>
   </schema>
   <schema targetNamespace="http://[address]"
xmlns="http://www.w3.org/2001/XMLSchema">
      <import namespace="http://schemas.xmlsoap.org/soap/encoding/"/>
      <complexType name="ChargeWrappedRequest">
         <complexContent>
            <extension base="tns3:WrappedRequest">
               <sequence>
                  <element name="accountID" nillable="true" type="xsd:string"/>
                  <element name="endDate" nillable="true" type="xsd:dateTime"/>
                  <element name="serviceID" nillable="true" type="xsd:string"/>
                  <element name="startDate" nillable="true" type="xsd:dateTime"/>
               </sequence>
            </extension>
         </complexContent>
      </complexType>
      <complexType name="ChargeWrappedResponse">
         <complexContent>
            <extension base="tns3:WrappedResponse">
               <sequence/>
            </extension>
         </complexContent>
      </complexType>
   </schema>
 </wsdl:types>
   <wsdl:message name="submitReqRequest">
      <wsdl:part name="chargeWrappedRequest"
type="tns2:ChargeWrappedRequest"/>
   </wsdl:message>
   <wsdl:message name="submitReqResponse">
      <wsdl:part name="submitReqReturn" type="tns2:ChargeWrappedResponse"/>
   </wsdl:message>
   <wsdl:portType name="ChargeAdapterFrontEnd">
      <wsdl:operation name="submitReq"
parameterOrder="chargeWrappedRequest">
         <wsdl:input message="intf:submitReqRequest" name="submitReqRequest"/>
         <wsdl:output message="intf:submitReqResponse"
name="submitReqResponse"/>
      </wsdl:operation>
   </wsdl:portType>
   <wsdl:binding name="ChargeAdapterFrontEndSoapBinding"
type="intf:ChargeAdapterFrontEnd">
      <wsdlsoap:binding style="rpc"
transport="http://schemas.xmlsoap.org/soap/http"/>
      <wsdl:operation name="submitReq">
         <wsdlsoap:operation soapAction=""/>
         <wsdl:input name="submitReqRequest">
            <wsdlsoap:body
encodingStyle="http://schemas.xmlsoap.org/soap/encoding/"
namespace="http://[address]" use="encoded"/>
         </wsdl:input>
         <wsdl:output name="submitReqResponse">
            <wsdlsoap:body
encodingStyle="http://schemas.xmlsoap.org/soap/encoding/"
namespace="http://[address]" use="encoded"/>
         </wsdl:output>
      </wsdl:operation>
   </wsdl:binding>
   <wsdl:service name="ChargeAdapterFrontEndService">
      <wsdl:port binding="intf:ChargeAdapterFrontEndSoapBinding"
name="ChargeAdapterFrontEnd">
         <wsdlsoap:address
location="http://localhost:8080/serverfinto/services/SdcCharge"/>
      </wsdl:port>
   </wsdl:service>
</wsdl:definitions>
```

The third party gateway 110 provides secure, efficient access to exposed services provided by a telecommunications service provider. The third party gateway 110 enhances third party authorization by employing certificate identifiers obtained during secure authentication. Including the certificate identifier in the company application record in the database 228 efficiently extends use of the certificate identifier to authorization, without requiring separate or independent authorization identifiers for company applications. The enhanced authorization of company applications provides strong protection against unauthorized third party access of valuable telecommunications.

Furthermore, the MSISDN field and certificate identifier field independent authorization criteria for different types of service requesters. In conjunction with the multiple level status fields in the data model, the data model supports flexible policy management for the service request handler 224. The policies may specify status criteria for records in the data model at one or more levels (e.g., the company level, the end-user level, or the company application level) within each branch in the data model before a request is considered authorized.

Summarizing the technique for securely allowing access for multiple different types of service requesters, the third party gateway 110 receives an exposed service request from a first type of service requester (e.g., a company application). The third party gateway 110 also receives a network communication service request from a second type of service requester (e.g., a mobile telephony device). The third party gateway authenticates the exposed service request and obtains a secure authorization identifier (e.g., a public key) from authenticating the exposed service request.

The profiling database 228 provides search results, based on the secure authorization identifier, from a service requester branch of a data model defined in the profiling database 228. The third party gateway 110 determines a company application represented in the search results. Authorization for the company application proceeds based on one or more status identifiers (e.g., a company application identifier) in the first search results.

With regard to the second type of service requester, the third party gateway extracts a device identifier from the network communication service request. The profiling database 228 also provides search results from a different service requester branch based on the device identifier. A subscriber device represented in second search results is determined and authorized based on one or more subscriber device status identifiers in the second search results.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

We claim:

1. A method for securely allowing access for multiple different types of service requesters to telecommunications services, the method comprising:
    receiving an exposed service request from a first type of service requester for access to an exposed service;
    authenticating the exposed service request;
    decoding a secure authorization identifier from the exposed service request to obtain a decoded secure authorization identifier;
    obtaining first search results from a first service requester branch defined in a profiling database based on the decoded secure authorization identifier;
    determining when a matching authorization identifier exists between the first search results and the decoded secure authorization identifier;
    when the matching authorization identifier exists, authorizing the first type of service requester based on a first type of service requester status identifier in the first search results and allowing access to the exposed service;
    receiving a network communication service request from a second type of service requester for access to a network communication service;
    extracting a device identifier from the network communication service request;
    obtaining second search results from a second service requester branch of a profiling database based on the device identifier;
    determining when a matching subscriber device exists between the second search results and the device identifier; and
    when the matching subscriber device exists, authorizing the second type of service requester based on a second type of service requester status identifier in the second search results and allowing access to the network communication service.

2. The method of claim 1, where receiving an exposed service request comprises:
    receiving an exposed telecommunications service request accompanied by a client certificate.

3. The method of claim 2, where the secure authorization identifier comprises a public key encoded in the client certificate.

4. The method of claim 1, where the first service requester branch comprises a company application table linked to a company table.

5. The method of claim 4, where the first service requester branch further comprises an installed service table linked to the company application table, and where authorizing the first type of service requester comprises:
    determining that the first type of service requester status identifier specifies that the company application is Active; and,
    determining that the installed service table defines an installed service record corresponding to the exposed service requested in the exposed service request and that is linked to a record for the first type of service requester.

6. The method of claim 5, where authorizing further comprises:
    determining that the installed service record has an Active status.

7. The method of claim 1, where the second service requester branch comprises a device identifier table linked to an end user table, the device identifier table comprising a device identifier record corresponding to the matching subscriber device.

8. The method of claim 7, where the device identifier table comprises a Mobile Subscriber Integrated Services Digital Network (MSISDN) table.

9. The method of claim 7, where authorizing the subscriber device comprises:
    determining that the second type of service requester status identifier specifies that the matching subscriber device is Active; and
    determining that the end user table defines an end user record with an Active status, the end user record linked to a device identifier record.

10. A product comprising:
a machine readable medium; and
instructions encoded on the machine readable medium which, when executed, cause a processor in an access gateway to perform a method comprising:
receiving an exposed service request from a first type of service requester for access to an exposed service;
authenticating the exposed service request
decoding a secure authorization identifier from the exposed service request to obtain a decoded secure authorization identifier;
obtaining first search results from a first service requester branch defined in a profiling database based on the decoded secure authorization identifier;
determining when a matching authorization identifier exists between the first search results and the decoded secure authorization identifier;
when the matching authorization identifier exists, authorizing the first type of service requester based on a first type of service requester status identifier in the first search results and allowing access to the exposed service;
receiving a network communication service request from a second type of service requester for access to a network communication service;
extracting a device identifier from the network communication service request;
obtaining second search results from a second service requester branch of a profiling database based on the device identifier;
determining when a matching subscriber device in exists between the second search results and the device identifier; and
when the matching subscriber device exists, authorizing the second type of service requester based on a second type of service requester status identifier in the second search results and allowing access to the network communication service.

11. The product of claim 10, where receiving an exposed service request comprises: receiving an exposed telecommunications service request accompanied by a client certificate.

12. The product of claim 10, where the secure authorization identifier comprises a public key encoded in the client certificate.

13. The product of claim 10, where the first service requester branch comprises a company application table linked to a company table.

14. The product of claim 10, where the first service requester branch further comprises an installed service table linked to the company application table.

15. The product of claim 10, where the second service requester branch comprises a device identifier table linked to an end user table.

16. The product of claim 10, where the first type of service requester comprises company applications, and where the second type of service requester comprises mobile telephony subscribers.

17. The method of claim 1, further comprising:
establishing, in the profiling database, the first service requester branch for the first type of service requester by providing a company application identifier that establishes a relation between a company application table and a company table; and,
establishing, in the profiling database, the second service requester branch for the second type of service requester by providing an end user identifier that establishes a relation between an end user table and the company table.

18. The product of claim 10, where the instructions encoded on the machine readable medium, when executed, further cause the processor to:
establish, in the profiling database, the first service requester branch for the first type of service requester by providing a company application identifier that establishes a relation between a company application table and a company table; and,
establish, in the profiling database, the second service requester branch for the second type of service requester by providing an end user identifier that establishes a relation between an end user table and the company table.

19. A data model stored in a machine readable medium for access by a processor in a third party access gateway in a telecommunications architecture, the data model comprising:
a root table;
a first service requester branch comprising a company application table off the root table, the company application table comprising:
a company application identifier specifying an authorized service requester, wherein the company application identifier establishes a relation between the company application table and the root table; and
a company application status identifier establishing a status for the authorized service requester identified by the company application identifier;
a second service requester branch comprising a device identifier table off the root table, the device identifier table comprising:
a subscriber device identifier specifying an authorized subscriber device; and
a subscriber device status identifier that provides a status for a subscriber device identified by the subscriber device identifier.

20. The data model of claim 19, where the company application identifier comprises a certificate identifier, and the certificate identifier comprises a public key component of a public key encryption pair.

21. The data model of claim 19, where the subscriber device identifier comprises a Mobile Subscriber Integrated Services Digital Network (MSISDN) identifier.

22. The data model of claim 19, where the second service requester branch further comprises an end-user table linked to the company table and to the device identifier table.

23. The data model of claim 22, where the end-user table comprises an end user status identifier.

24. The data model of claim 22, where the company table comprises a company status identifier.

25. The data model of claim 19, where the company application table further comprises a company identifier linking the company application table to the company table.

* * * * *

UNITED STATES PATENT AND TRADEMARK OFFICE
CERTIFICATE OF CORRECTION

| | | |
|---|---|---|
| PATENT NO. | : 7,925,880 B2 | Page 1 of 1 |
| APPLICATION NO. | : 11/313441 | |
| DATED | : April 12, 2011 | |
| INVENTOR(S) | : Giovanni D'Angelo et al. | |

It is certified that error appears in the above-identified patent and that said Letters Patent is hereby corrected as shown below:

Page 2, col. 1,

Under "U.S. PATENT DOCUMENTS" insert the following:

--2007/0067385    3/2007    D'Angelo et al.--.

Signed and Sealed this
Twentieth Day of September, 2011

David J. Kappos
*Director of the United States Patent and Trademark Office*